(12) United States Patent
Kusaki et al.

(10) Patent No.: US 11,682,169 B2
(45) Date of Patent: Jun. 20, 2023

(54) ORTHO-IMAGE CREATION METHOD, ORTHO-IMAGE CREATION SYSTEM, THREE-DIMENSIONAL MODEL CREATION METHOD, THREE-DIMENSIONAL MODEL CREATION SYSTEM, AND MARKER USED THEREFOR

(71) Applicant: MR Support Inc., Kyoto (JP)

(72) Inventors: Shigeo Kusaki, Kyoto (JP); Takamitsu Mori, Kyoto (JP)

(73) Assignee: MR Support Inc., Kyoto (JP)

( * ) Notice: Subject to any disclaimer, the term of this patent is extended or adjusted under 35 U.S.C. 154(b) by 129 days.

(21) Appl. No.: 17/392,420

(22) Filed: Aug. 3, 2021

(65) Prior Publication Data
US 2022/0058863 A1 Feb. 24, 2022

(30) Foreign Application Priority Data

Aug. 21, 2020 (JP) .............................. JP2020-140260

(51) Int. Cl.
*G06T 17/00* (2006.01)
*G06T 17/05* (2011.01)
(Continued)

(52) U.S. Cl.
CPC ............ *G06T 17/05* (2013.01); *B64C 39/024* (2013.01); *B64D 47/08* (2013.01); *G01C 11/02* (2013.01); *G01S 19/01* (2013.01); *G06T 7/55* (2017.01); *G06T 7/74* (2017.01); *B64U 10/13* (2023.01); *B64U 2101/30* (2023.01);
(Continued)

(58) Field of Classification Search
None
See application file for complete search history.

(56) References Cited

U.S. PATENT DOCUMENTS

| 2010/0086174 A1* | 4/2010 | Kmiecik | G06T 7/90 382/199 |
| 2012/0050489 A1* | 3/2012 | Gupta | G06T 7/41 348/148 |

(Continued)

FOREIGN PATENT DOCUMENTS

JP 2018-123510 A 8/2018

*Primary Examiner* — Martin Mushambo
(74) *Attorney, Agent, or Firm* — WHDA, LLP

(57) ABSTRACT

An ortho-image creation method includes: first photographing of photographing a road; second photographing of photographing an area covered by the obstacle from an altitude lower than the obstacle by a second photographing apparatus, and obtaining a plurality of second photographed images; first coordinate acquisition of acquiring three-dimensional coordinates; second coordinate acquisition of acquiring three-dimensional coordinates of a second feature point located in the area covered by the obstacle and included in at least two of the plurality of second photographed images; and ortho-image creation of creating a corrected ortho-image obtained by correcting at least a part of the area covered by the obstacle in the road surface to an area not covered by the obstacle, on the basis of the plurality of first photographed images, the plurality of second photographed images, the three-dimensional coordinates of the first feature point, and the three-dimensional coordinates of the second feature point.

20 Claims, 23 Drawing Sheets

(51) Int. Cl.
*G06T 7/73* (2017.01)
*G06T 7/55* (2017.01)
*B64C 39/02* (2023.01)
*B64D 47/08* (2006.01)
*G01C 11/02* (2006.01)
*G01S 19/01* (2010.01)
*B64U 10/13* (2023.01)
*B64U 101/30* (2023.01)

(52) U.S. Cl.
CPC ............... *G06T 2207/10032* (2013.01); *G06T 2207/30184* (2013.01); *G06T 2207/30204* (2013.01)

(56) References Cited

U.S. PATENT DOCUMENTS

| | | | |
|---|---|---|---|
| 2016/0171278 A1* | 6/2016 | Ponder | G06T 7/90 382/104 |
| 2017/0131400 A1* | 5/2017 | Feng | G01C 21/3694 |
| 2018/0188728 A1* | 7/2018 | Erickson | G05D 1/104 |
| 2018/0188738 A1* | 7/2018 | Tatourian | G05D 1/0274 |
| 2019/0094875 A1* | 3/2019 | Schulter | G06T 17/05 |
| 2019/0096125 A1* | 3/2019 | Schulter | G06T 15/405 |

* cited by examiner

ORTHO-IMAGE CREATION METHOD, ORTHO-IMAGE CREATION SYSTEM, THREE-DIMENSIONAL MODEL CREATION METHOD, THREE-DIMENSIONAL MODEL CREATION SYSTEM, AND MARKER USED THEREFOR

CROSS-REFERENCE TO RELATED APPLICATIONS

This application claims priority of Japanese Patent Applications No. 2020-140260 filed on Aug. 21, 2020. The contents of the applications are incorporated herein by reference in their entirety.

BACKGROUND

Field of the Invention

The present invention relates to an ortho-image creation method, an ortho-image creation system, a three-dimensional model creation method, and a three-dimensional model creation system for creating an ortho-image on the basis of photographed images photographed from the sky by, for example, an unmanned aerial vehicle, and a marker used therefor.

Description of the Related Documents

Conventionally, when damage such as cracks occurs on a surface of asphalt pavement that constitutes a surface layer of a road, it is necessary to repair the road.

In order to repair a road, various surveys such as surveys of a road condition (for example, a cracking condition), the locations of edges of a road and the locations of planar elements including compartment lines such as lane marking lines at the time of repair construction are conducted. Conventionally, for example, in the survey of the crack condition, the surveys of a cracked area and a crack amount in a road are performed by the visual observation of a surveyor. Instead of detection of a crack by a surveyor, the road condition is sometimes surveyed by using a special road surface condition survey vehicle (see Japanese Patent Laid-Open No. 2018-123510).

The work of surveying a road by surveyors and detecting cracks is very complicated. When the road condition is surveyed by the special road condition survey vehicle, it is necessary to cause the road surface condition survey vehicle to travel. However, the road surface condition survey vehicle cannot travel an a road with a small width, and therefore it is impossible to survey the road condition.

In order to solve the above technical problems, it is considered that an unmanned aerial vehicle flying in the sky at the time of repair construction photographs a road, an ortho-image of the road at the time of repair construction is created on the basis of photographed images thus photographed, and a crack on a surface of the road is detected from the ortho-image.

However, when there is an obstacle, for example, a roadside tree around the road and the obstacle covers the edge in the width direction of the road surface, it is impossible to photograph a portion covered by the obstacle in the road surface even when an unmanned aerial vehicle flying in the sky photographs the road surface. Therefore, it is impossible to create an ortho-image including the entire road surface, and it is impossible to survey cracks on the road surface covered by obstacles. In a case where an obstacle covers an edge in the width direction of a road surface, even when an unmanned aerial vehicle flying in the sky photographs the road surface, it is impossible to photograph the portion covered by the obstacle in the road surface, and it is impossible to survey the width of the road (the locations of the edges of the road) and the locations of planar elements including compartment lines such as lane marking lines. When a road is photographed by an unmanned aerial vehicle flying in the sky, examples of an obstacle similar to the above-mentioned obstacle include a pedestrian bridge and a traffic light disposed above a road surface.

The present invention has been made with a focus on such a problem, and an object of the present invention is to provide an ortho-image creation method and an ortho-image creation system that make it possible to easily survey a road condition at the time of repair construction on the basis of photographed images photographed from the sky even when there is an obstacle that partially covers the road surface, and a marker used therefore, and a three-dimensional model creation method and a three-dimensional model creation system, that make it possible to easily survey a road condition at the time of repair construction on the basis of photographed images photographed from the sky even when there is an obstacle that partially covers the road surface, and a marker used therefore.

SUMMARY

In order to solve such problems, the present invention provides the following solutions.

That is, an ortho-image creation method according to the present invention includes: first photographing of photographing a road, a road surface of which is partially covered by an obstacle when viewed from sky, from an altitude higher than the obstacle by a first photographing apparatus, and obtaining a plurality of first photographed images; second photographing of photographing an area covered by the obstacle from an altitude lower than the obstacle by a second photographing apparatus, and obtaining a plurality of second photographed images; first coordinate acquisition of acquiring three-dimensional coordinates of a first feature point located outside the area covered by the obstacle and included in at least two of the plurality of first photographed images; second coordinate acquisition of acquiring three-dimensional coordinates of a second feature point located in the area covered by the obstacle and included in at least two of the plurality of second photographed images; and ortho-image creation of creating a corrected ortho-image obtained by correcting at least a part of the area covered by the obstacle in the road surface to an area not covered by the obstacle, on the basis of the plurality of first photographed images photographed by the first photographing, the plurality of second photographed images photographed by the second photographing, the three-dimensional coordinates of the first feature point acquired by the first coordinate acquisition, and the three-dimensional coordinates of the second feature point acquired by the second coordinate acquisition.

An ortho-image creation system according to the present invention includes: a first photographed image storage unit for storing a plurality of first photographed images obtained by photographing a road, a road surface of which is partially covered by an obstacle when viewed from sky; from an altitude higher than the obstacle by a first photographing apparatus; a second photographed image storage unit for storing a plurality of second photographed images obtained by photographing an area covered by the obstacle from an altitude lower than the obstacle by a second photographing apparatus; a first coordinate storage unit for storing three-dimensional coordinates of a first feature point located outside the area covered by the obstacle and included in at least two of the plurality of first photographed images; a second coordinate storage unit for storing three-dimensional coordinates of a second feature point located in the area covered by the obstacle and included in at least two of the plurality of second photographed images; and an ortho-image creation unit for creating a corrected ortho-image obtained by correcting at least a part of the area covered by the obstacle in the road surface to an area not covered by the obstacle, on the basis of the plurality of first photographed images stored in the first photographed image storage unit, the plurality of second photographed images stored in the second photographed image storage unit, the three-dimensional coordinates of the first feature point stored in the first coordinate storage unit, and the three-dimensional coordinates of the second feature point stored in the second coordinate storage unit.

Consequently, in the ortho-image creation method and the ortho-image creation system according to the present invention, even when the road surface is partially covered by the obstacle when viewed from the sky, it is possible to create the corrected ortho-image obtained by correcting the area partially covered by the obstacle in the road surface to the area not covered by the obstacle. Therefore, even when there is the obstacle that partially covers the road surface, it is possible to easily survey a road condition at the time of repair construction on the basis of the photographed images photographed from the sky.

In the ortho-image creation method according to the present invention, the ortho-image creation includes: first ortho-image creation of creating a provisional ortho-image in which the road surface is partially covered by the obstacle, on the basis of the plurality of first photographed images photographed by the first photographing, and the three-dimensional coordinates of the first feature point acquired by the first coordinate acquisition; shape detection of detecting a shape of the road surface and at least a part of a portion other than the road surface in the area covered by the obstacle, on the basis of the plurality of second photographed images photographed by the second photographing and the three-dimensional coordinates of the second feature point acquired by the second coordinate acquisition; and second ortho-image creation of creating the corrected ortho-image obtained by correcting at least a port of an area covered by the obstacle in the provisional ortho-image created by the first ortho-image creation to an area not covered by the obstacle.

In the ortho-image creation system according to the present invention, the ortho-image creation unit includes: a first ortho-image creation unit for creating a provisional ortho-image in which the road surface is partially covered by the obstacle, on the basis of the plurality of first photographed images stored in the first photographed image storage unit, and the three-dimensional coordinates of the first feature point stored in the first coordinate storage unit; a shape detection unit for detecting a shape of the road surface and at least a part of a portion other than the road surface in the area covered by the obstacle, on the basis of the plurality of second photographed images stored in the second photographed image storage unit and the three-dimensional coordinates of the second feature point stored in the second coordinate storage unit; and a second ortho-image creation unit for creating the corrected ortho-image obtained by correcting at least a part of an area covered by the obstacle in the provisional ortho-image created by the first ortho-image creation unit to an area not covered by the obstacle.

Consequently, in the ortho-image creation method and the ortho-image creation system according to the present invention, even when the road surface is partially covered by the obstacle when viewed from the sky, it is possible to create the corrected ortho-image obtained by correcting the area partially covered by the obstacle in the road surface in the provisional ortho-image to the area not covered by the obstacle. Therefore, even when there is the obstacle that partially covers the road surface, it is possible to easily survey a road condition at the time of repair construction on the basis of the photographed images photographed from the sky.

In the ortho-image creation method according to the present invention, the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

In the ortho-image creation system according to the present invention, the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

Consequently, in the ortho-image creation method and the ortho-image creation system according to the present invention, the plurality of first photographed images obtained by photographing the road surface not covered by the obstacle from the altitude higher than the obstacle, and the plurality of second photographed images obtained by photographing the road surface covered by the obstacle from the altitude lower than the obstacle can be easily obtained by the unmanned aerial vehicle or the model aircraft.

In the ortho-image creation method according to the present invention, in the second photographing, a plurality of markers are installed on the road surface and the obstacle in the area covered by the obstacle, and photographing is performed such that each of the plurality of markers is included as the second feature point in at least two of the second photographed images.

In the ortho-image creation system according to the present invention, the plurality of second photographed images stored in the second photographed image storage unit are photographed such that each of a plurality of markers installed on the road surface and the obstacle in the area covered by the obstacle is included as the second feature point in at least two of the second photographed images.

Consequently in the ortho-image creation method and the ortho-image creation system according to the present invention, the shape of the road surface in the area covered by the obstacle and the obstacle can be precisely grasped by the plurality of second photographed images photographed from the altitude lower than the obstacle.

The marker according to the present invention is a marker used for the ortho-image creation method according to the present invention, the marker being a seal-like marker having a back surface formed with an adhesive layer. Consequently, in the marker according to the present invention, the marker can be easily fixed at an installation place.

The marker according to the present invention is a marker used for the ortho-image creation system according to the present invention, the marker being a seal-like marker having a back surface formed with an adhesive layer. Consequently, in the marker according to the present invention, the marker can be easily fixed at an installation place.

A three-dimensional model creation method according to the present invention includes: first photographing of photographing a road, a road surface of which is partially covered by an obstacle when viewed from sky, from an altitude higher than the obstacle by a first photographing apparatus, and obtaining a plurality of first photographed images; second photographing of photographing an area covered by the obstacle from an altitude lower than the obstacle by a second photographing apparatus, and obtaining a plurality of second photographed images; first coordinate acquisition of acquiring three-dimensional coordinates of a first feature point located outside the area covered by the obstacle and included in at least two of the plurality of first photographed images; second coordinate acquisition of acquiring three-dimensional coordinates of a second feature point located in the area covered by the obstacle and included in at least two of the plurality of second photographed images; and three-dimensional model creation of creating a corrected three-dimensional model obtained by correcting at least a part of the area covered by the obstacle in the road surface to an area not covered by the obstacle, on the basis of the plurality of first photographed images photographed by the first photographing, the plurality of second photographed images photographed by the second photographing, the three-dimensional coordinates of the first feature point acquired by the first coordinate acquisition, and the three-dimensional coordinates of the second feature point acquired by the second coordinate acquisition.

A three-dimensional model creation system according to the present invention includes: a first photographed image storage unit for storing a plurality of first photographed images obtained by photographing a road, a road surface of which is partially covered by an obstacle when viewed from sky, from an altitude higher than the obstacle by a first photographing apparatus; a second photographed image storage unit for storing a plurality of second photographed images obtained by photographing an area covered by the obstacle from an altitude lower than the obstacle by a second photographing apparatus; a first coordinate storage unit for storing three-dimensional; coordinates of a first feature point located outside the area covered by the obstacle and included in at least two of the plurality of first photographed images; a second coordinate storage unit for storing three-dimensional coordinates of a second feature point located in the area covered by the obstacle and included in at least two of the plurality of second photographed images; and a three-dimensional model creation unit for creating a corrected three-dimensional model obtained by correcting at least a part of the area covered by the obstacle in the road surface to an area not covered by the obstacle, on the basis of the plurality of first photographed images stored in the first photographed image storage unit, the plurality of second photographed images stored in the second photographed image storage unit, the three-dimensional coordinates of the first feature point stored in the first coordinate storage unit, and the three-dimensional coordinates of the second feature point stored in the second coordinate storage unit.

Consequently, in the three-dimensional model creation method and the three-dimensional model creation system according to the present invention, even when the road surface is partially covered by the obstacle when viewed from the sky, it is possible to create the corrected three-dimensional model obtained by correcting the area partially covered by the obstacle in the road surface to the area not covered by the obstacle. Therefore, even when there is the obstacle that partially covers the road surface, it is possible to survey the width of the road (the locations of the edges of the road) and the locations of planar elements including compartment lines such as lane marking lines at the time of repair construction on the basis of the photographed images photographed from the sky.

In the three-dimensional model creation method according to the present invention, the three-dimensional model creation includes: first three-dimensional model creation of creating a provisional three-dimensional model in which the road surface is partially covered by the obstacle, on the basis of the plurality of first photographed images photographed by the first photographing, and the three-dimensional coordinates of the first feature point acquired by the first coordinate acquisition; shape detection of detecting a shape of the road surface and at least a part of a portion other than the road surface in the area covered by the obstacle, on the basis of the plurality of second photographed images photographed by the second photographing and the three-dimensional coordinates of the second feature point acquired by the second coordinate acquisition; and second three-dimensional model creation of creating the corrected three-dimensional model obtained by correcting at least a part of an area covered by the obstacle in the provisional three-dimensional model created by the first three-dimensional model creation to an area not covered by the obstacle.

In the three-dimensional model creation system according to the present invention, the three-dimensional model creation unit includes: a first three-dimensional model creation unit for creating a provisional three-dimensional model in which the road surface is partially covered by the obstacle, on the basis of the plurality of first photographed images stored in the first photographed image storage unit, and the three-dimensional coordinates of the first feature point stored in the first coordinate storage unit; a shape detection unit for detecting a shape of the road surface and at least a part of a portion other than the road surface in the area covered by the obstacle, on the basis of the plurality of second photographed images stored in the second photographed image storage unit and the three-dimensional coordinates of the second feature point stored in the second coordinate storage unit; and a second three-dimensional model creation unit for creating the corrected three-dimensional model obtained by correcting at least a part of an area covered by the obstacle in the provisional three-dimensional model created by the first three-dimensional model creation to an area not covered by the obstacle.

Consequently, in the three-dimensional model creation method and the three-dimensional model creation system according to the present invention, even when the road surface is partially covered by the obstacle when viewed from the sky, it is possible to create the corrected three-dimensional model obtained by correcting the area partially covered by the obstacle in the road surface in the provisional three-dimensional model, to the area not covered by the obstacle. Therefore, even when there is the obstacle that partially covers the road surface, it is possible to survey the width of the road (the locations of the edges of the road) and the locations of planar elements including compartment lines such as lane marking lines at the time of repair construction on the basis of the photographed images photographed from the sky.

In the three-dimensional model creation method according to the present invention, the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

In the three-dimensional model creation system according to the present invention, the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

Consequently, in the three-dimensional model creation method and the three-dimensional model creation system according to the present invention, the plurality of first photographed images obtained by photographing the road surface not covered by the obstacle from the altitude higher than the obstacle, and the plurality of second photographed images obtained by photographing the road surface covered by the obstacle from the altitude lower than the obstacle can be easily obtained by the unmanned aerial vehicle or the model aircraft.

In the three-dimensional model creation method according to the present invention, in the second photographing, a plurality of markers are installed on the road surface and the obstacle in the area covered by the obstacle, and photographing is performed such that each of the plurality of markers is included as the second feature point in at least two of the second photographed images.

In the three-dimensional model creation system according to the present invention, the plurality of second photographed images stored in the second photographed image storage unit are photographed such that each of a plurality of markers installed on the road surface and the obstacle in the area covered by the obstacle is included as the second feature point in at least two of the second photographed images.

Consequently, in the three-dimensional model creation method and the three-dimensional model creation system according to the present invention, the shape of the road surface in the area covered by the obstacle and the obstacle can be precisely grasped by the plurality of second photographed images photographed from the altitude lower than the obstacle.

The marker according to the present invention is a marker used for the three-dimensional model creation method according to the present invention, the marker being a seal-like marker having a back surface formed with an adhesive layer. Consequently, in the marker according to the present invention, the marker can be easily fixed at an installation place.

The marker according to the present invention is a marker used for the three-dimensional model creation system according to the present invention, the marker being a seal-like marker having a back surface formed with an adhesive layer. Consequently, in the marker according to the present invention, the marker can be easily fixed at an installation place.

Thus, according to the present invention, even when there is the obstacle that partially covers the road surface, it is possible to easily survey a road condition at the time of repair construction on the basis of the photographed images photographed from the sky.

DETAILED DESCRIPTION

Figure 1:
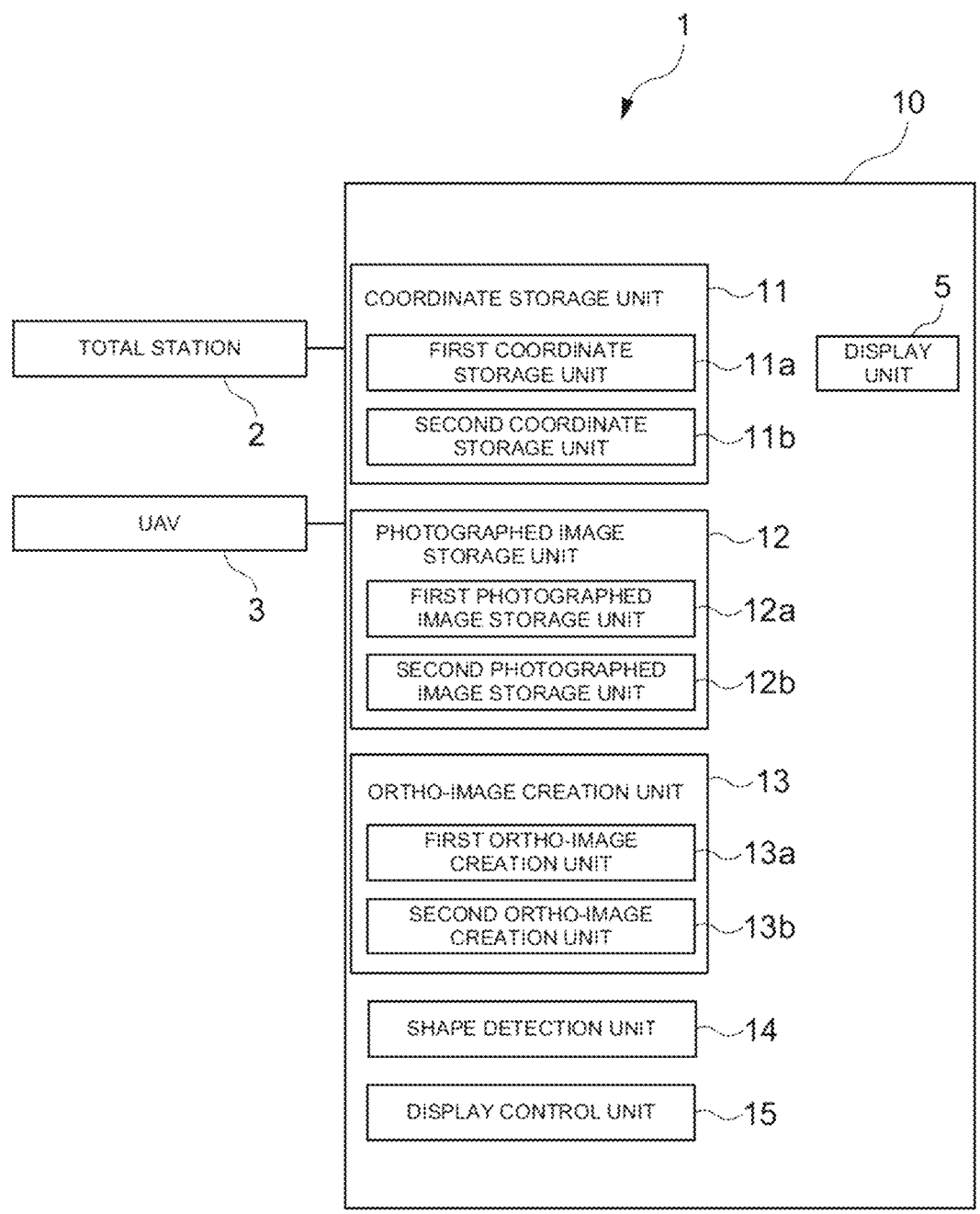
FIG. 1 is a diagram illustrating a schematic configuration of an ortho-image creation system according to an embodiment of the present invention.

Hereinafter, embodiments of the present invention will be described with reference to the drawings. In this embodiment, a case where there is a street tree that serves as an obstacle in the periphery of a road, and the periphery of the road is photographed from the above, and a case where the road surface is partially covered by the street tree will be described.

An ortho-image creation system 1 according to the embodiment of the present invention has a total station 2 installed at a known point (e.g., a reference point), a UAV (unmanned aerial vehicle) 3 as a photographing apparatus, and an ortho-image creation apparatus 10 wirelessly connected to the total station 2 and the UAV 3.

The total station 2 emits ranging light toward each point on a surface of a road, receives reflected light reflected at each point, acquires three-dimensional coordinates of each point relative to the known point on the basis of the number of times of oscillation of a light wave from the light emission to the light reception, and supplies the three-dimensional coordinates to the ortho-image creation system 10. In this embodiment, the total station 2 is used to acquire the three-dimensional coordinates of a plurality of survey markers 6.

The UAV 3 has a photographing apparatus, photographs a road surface from the sky acquires photographic data, and supplies the photographic data to the ortho-image creation apparatus 10. The UAV 3 is capable of photographing while flying at an altitude higher than an obstacle as well as flying at an altitude lower than the obstacle.

The ortho-image creation apparatus 10 is composed of, for example, a microcomputer or the like, and includes a CPU, a ROM that stores a program for controlling operation of the ortho-image creation apparatus 10, and a RAM that temporarily stores data and the like used for execution of the above program.

As illustrated in FIG. 1, the ortho-image creation apparatus 10 has a coordinate storage unit 11, a photographed image storage unit 12, an ortho-image creation unit 13, a shape detection unit 14, and a display control unit 15. The coordinate storage unit 11 has a first coordinate storage unit 11*a* and a second coordinate storage unit 11*b*. The photographed image storage unit 12 has a first photographed image storage unit 12*a* and a second photographed image storage unit 12*b*. The ortho-image creation unit 13 has a first ortho-image creation unit 13*a* and a second ortho-image creation unit 13*b*. The ortho-image creation apparatus 10 has a display unit 5 such as a display screen.

The coordinate storage unit 11 separately stores the three-dimensional coordinates of feature points of the plurality of survey markers 6 and the like acquired by the total station 2. The first coordinate storage unit 11*a* stores three-dimensional coordinates of the survey markers 6 (first feature points) installed outside an area covered by the obstacle when the UAV 3 flying at an altitude higher than the obstacle that partially covers the road surface photographs. The second coordinate storage unit 11*b* stores three-dimensional coordinates of the survey markers 8 (second feature points) installed in the area covered by the obstacle when the UAV 3 flying at the altitude lower than the obstacle partially covering the road surface photographs.

The photographed image storage unit 12 stores a plurality of images obtained by photographing the mad from the sky by the UAV 3 flying at an almost constant altitude above the road. The first photographed image storage unit 12*a* stores a plurality of first photographed images obtained by photographing the road, a road surface of which is partially covered by the obstacle when viewed from the sky, from the altitude higher than the obstacle. The second photographed image storage unit 12*b* stores a plurality of second photographed images obtained by photographing an area covered by the obstacle from the altitude lower than the obstacle.

In this embodiment, the UAV 3 flies at an altitude of 20 meters or less above the ground at the time of photographing, for example, at an altitude of 3 to 20 meters, preferably at an altitude of 3 to 15 meters.

Obstacles that are in the periphery of the road, and partially cover the road surface when viewed from the sky are, for example, between about 3 and 10 meters high. Therefore, when the UAV 3 photographs at an altitude higher than the obstacle, the UAV 3 flies, for example, 10 to 20 meters above the ground, and when the UAV 3 photographs at a lower altitude than the obstacle, the UAV 3 flies, for example, 3 to 10 meters above the ground.

Figure 2:
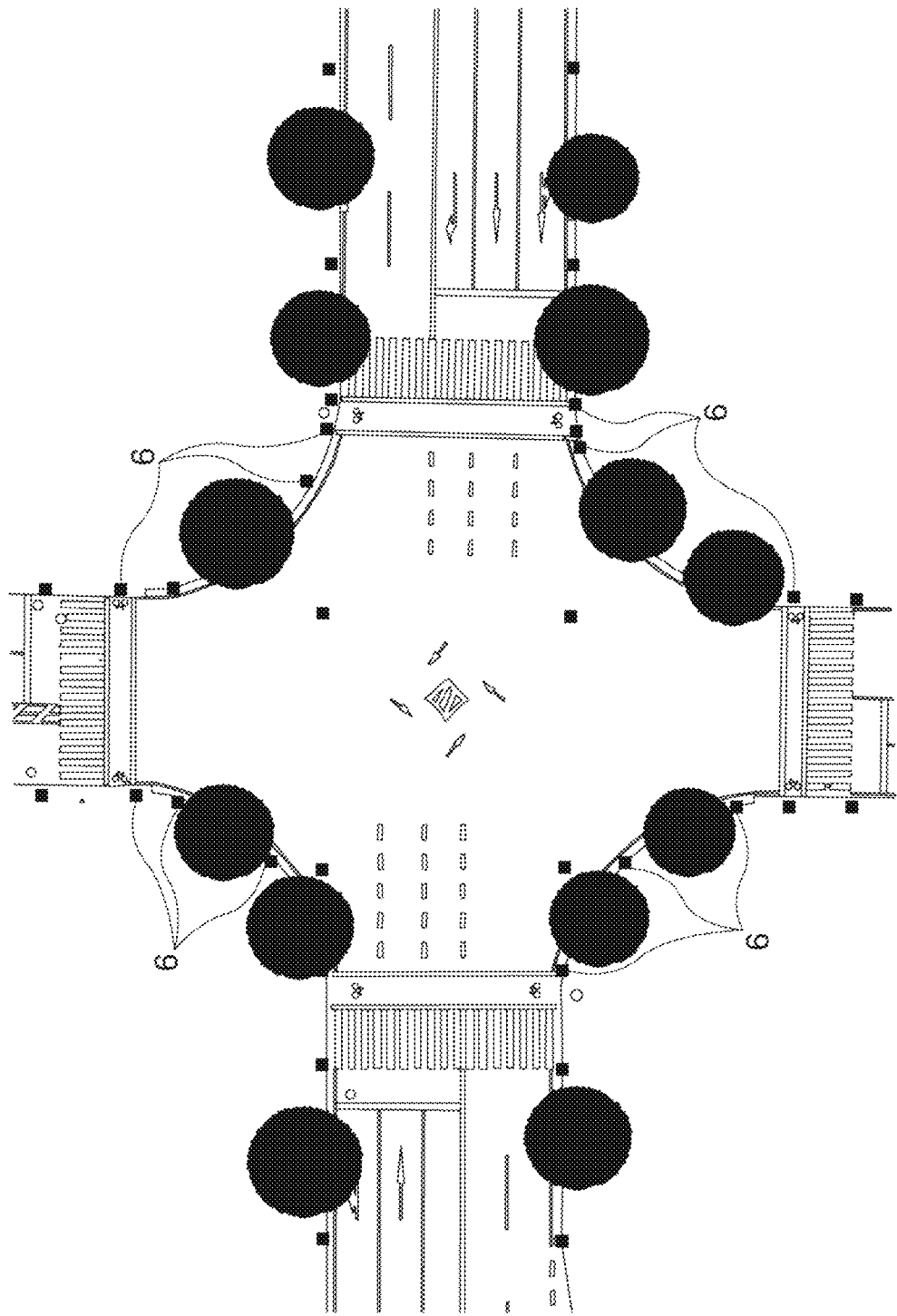
FIG. 2 is a diagram illustrating a state in which a plurality of survey markers are installed near both edge of a road when the road is photographed from the sky.

When the road is photographed by the UAV 3 flying at the altitude higher than the obstacle, a plurality of the survey markers 6 are installed as a plurality of feature points, for example, near both edges of the road, as illustrated in FIG. 2. The plurality of survey markers 6 are installed in an area not covered by obstacles, for example, installed at intervals of 5 to 15 meters along the edges of the road (in the longitudinal direction of the road). The plurality of survey markers 6 are installed in consideration of connection of the plurality of photographed images photographed from the sky and creation of an ortho-image. Each survey marker 6 is a feature point, three-dimensional coordinates of which are to be provided, and is used as a rating point. In addition to the survey markers 6, feature points, which are included in the plurality of photographed images, and three-dimensional coordinates of which are not provided may be used when the plurality of photographed images are connected to create an ortho-image.

Figure 3:
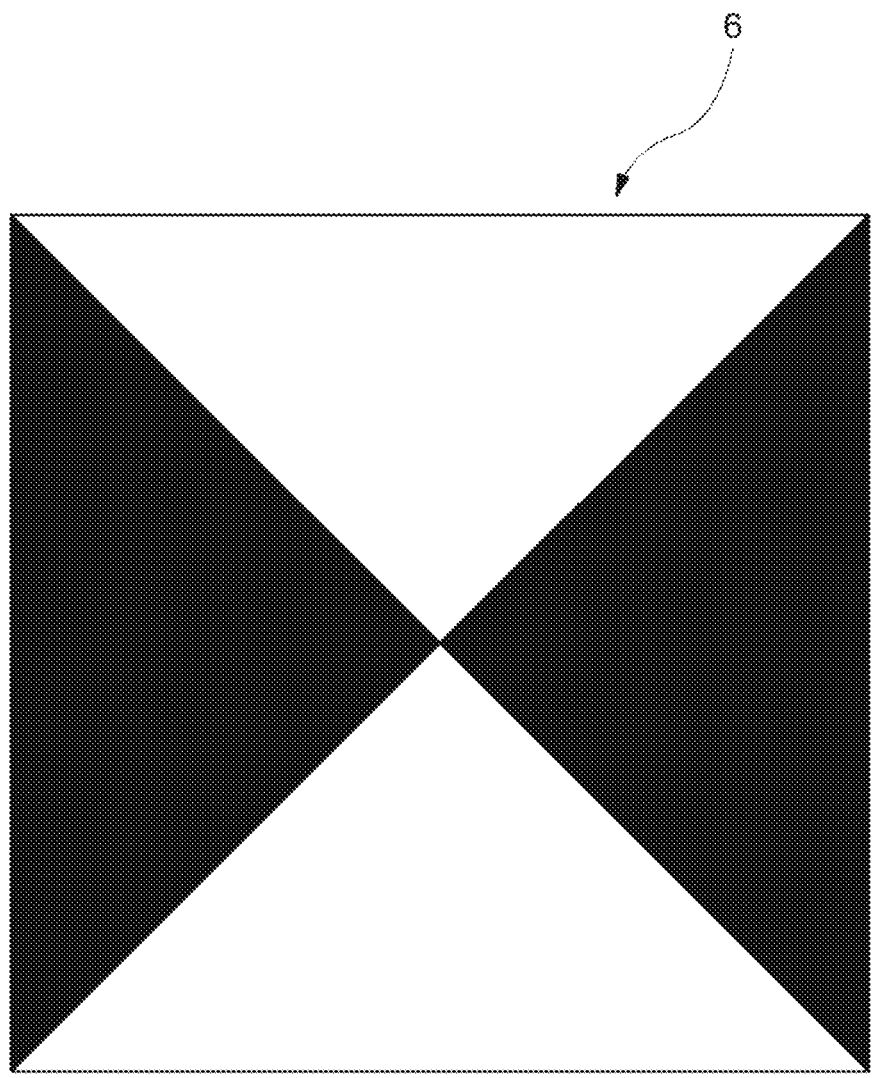
FIG. 3 is a diagram illustrating the survey marker.

Each survey marker 6 is a square plate-like member as illustrated in FIG. 3. The survey marker 6 is marked with a pattern that makes a center location clear. The survey marker 6 has a back surface formed with an adhesive layer, and is a seal-like marker attached with a backing paper so as to cover the adhesive layer, and can be easily fixed at an installation place by removing the backing paper and attaching the survey marker to the road. Accordingly, when the survey marker 6 is used, the backing paper covering the adhesive layer is removed and the back surface of the survey marker 6 is attached to the road surface. The survey marker 6 of this embodiment is, for example, a square shape of 9 cm×9 cm, but the type, the shape, the size, the pattern, and the like of the survey marker 6 is not limited thereto.

Figure 4:
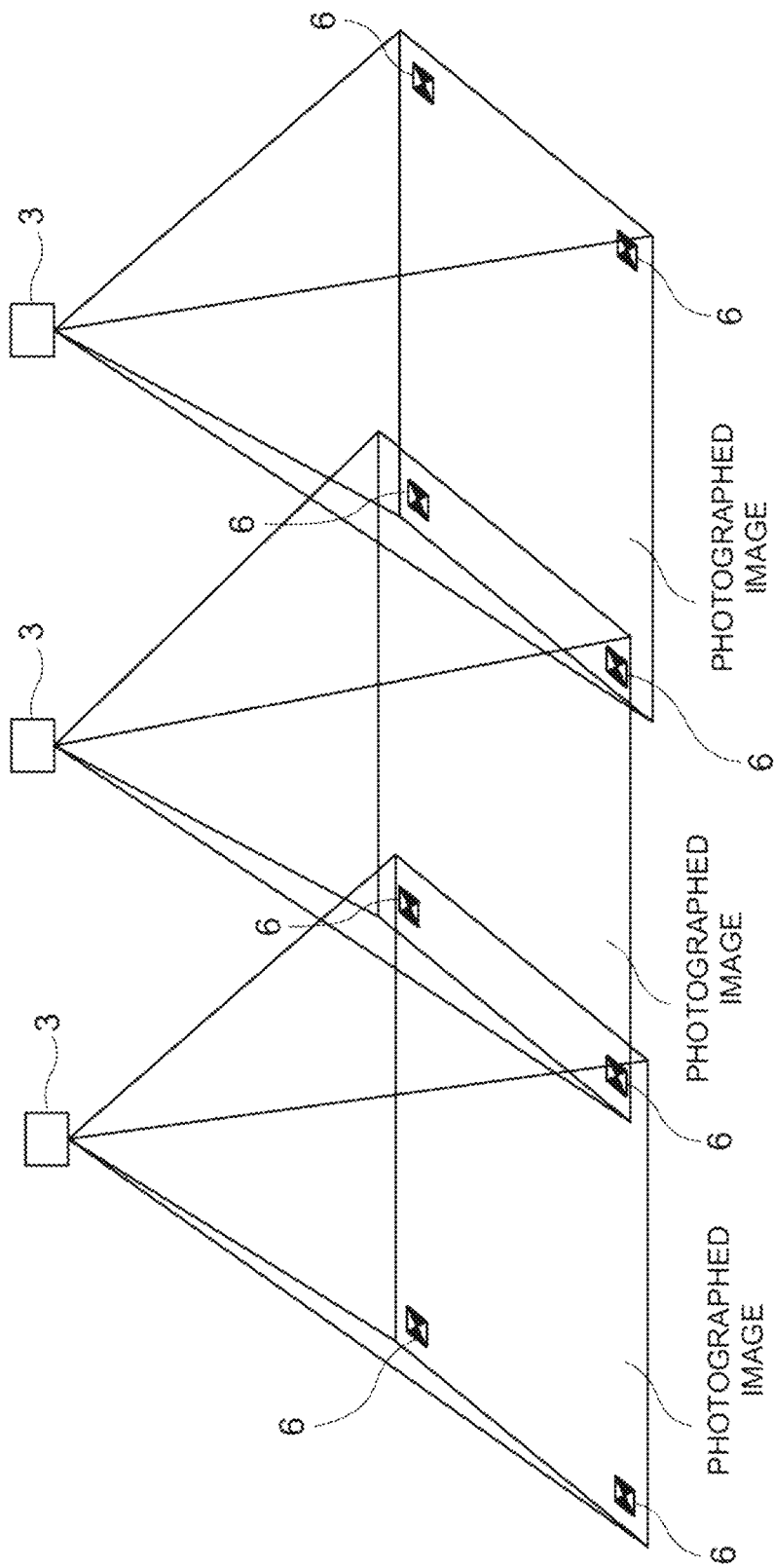
FIG. 4 is a diagram illustrating a state in which the survey markers are included in each two photographed images.

The plurality of images photographed by the UAV 3 flying at the altitude higher than the obstacles are photographed such that each survey marker 6 is included in at least two of the photographed images, as illustrated in FIG. 4. Therefore, at least one common survey marker 6 is photographed in each two adjacent images. Although FIG. 4 illustrates a case where the survey markers 6 are included in all of the photographed images, the plurality of images photographed by the UAV 3 may be photographed so as to include either the survey marker 6 or the feature point other than the survey marker 6 are included in at least two of the photographed images.

Figure 8:
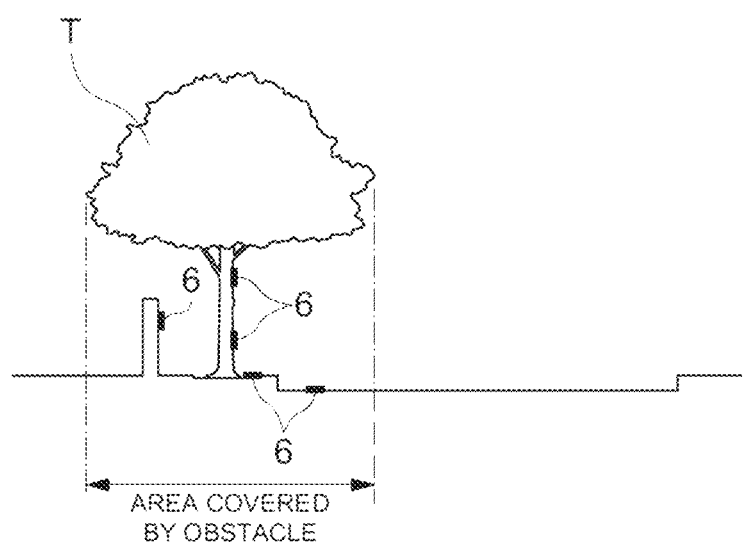
FIG. 8 is a diagram illustrating a state in which survey markers are installed in an area covered by the obstacle.

When the survey markers 6 are photographed by the UAV 3 flying at the altitude higher than the obstacles partially covering the road surface, the survey markers 6 are installed outside areas covered by the obstacles, as illustrated in FIG. 2. In contrast, when the survey markers 6 are photographed by the UAV 3 flying at the altitude lower than each obstacle partially covering the road surface, the survey markers 6 are installed on a road surface or a part of the obstacle in the area covered by the obstacle, as illustrated in FIG. 8.

The ortho-image creation unit 13 creates an ortho-image on the basis of the three-dimensional coordinates of the survey markers 6 stored in the coordinate storage unit 11 and a plurality of the photographed images stored in the photographed image storage unit 12. Specifically, the ortho-image creation unit 13 creates a three-dimensional model based on three-dimensional data (point cloud data) by connecting two adjacent photographed images on the basis of the common survey marker 6 photographed in those photographed images by performing SfM (Structure from Motion) analysis or the like of the data of the plurality of photographed images, and creates an ortho-image on the basis of the three-dimensional model.

In detail, the first ortho-image creation unit 13a creates a provisional ortho-image on the basis of a plurality of the first photographed images stored in the first photographed image storage unit 12a and the three-dimensional coordinates of the survey markers 6 installed outside the area covered by the obstacles stored in the first coordinate storage unit 11a. In the provisional ortho-image, the road surface is partially covered by the obstacles.

The second ortho-image creation unit 13b creates a corrected ortho-image on the basis of the provisional ortho-image created by the first ortho-image creation unit 13a and the shape (three-dimensional shape) of the road surface and a portion other than the mad surface (including obstacle) in the area covered by the obstacle detected by the shape detection unit 14. Specifically, the second ortho-image creation unit 13b designates a predetermined range including the area covered by the obstacle in the provisional ortho-image, and replaces the predetermined range with the shave (mesh data) detected by the shape detection unit 14 to create a corrected ortho-image obtained by correcting the area covered by the obstacle to an area not covered by the obstacle. In a method for creating a corrected ortho-image according to this embodiment, the provisional ortho-image is used as a background, the ortho-image for correction (mesh data→ortho-image) is created on the background, and the ortho-image for correction is integrated with the provisional ortho-image to create the corrected ortho-image (the final integration is integration between the ortho-images). Therefore, this integration method for creating a corrected ortho-image of this embodiment corresponds to (Integration Method 3 for Creating Corrected Ortho-image) described below.

The shape detection unit 14 creates mesh data corresponding to the shape (three-dimensional shape) of the road surface and the portion other than the road surface (including the obstacles) in the area covered by each obstacle on the basis of the plurality of second photographed images stored in the second photographed image storage unit 12b and the three-dimensional coordinates of the survey markers 6 installed in the area covered by each obstacle stored in the second coordinate storage unit 11b.

The display control unit 15 displays, on the display unit 5, the ortho-image created by the ortho-image creation unit 13.

Creation of Ortho-Image

The creation method for creating an ortho-image in the ortho-image creation apparatus 10 will be described with reference to FIG. 5. In this embodiment, a method for creating an ortho-image of a road, a road surface of which is not covered by an obstacle when there is an obstacle in the periphery of the road, and the road surface is partially covered by the obstacle when viewed from the sky will be described.

In Step S1 (first coordinate acquisition step), the total station 2 acquires three-dimensional coordinates, that is, plane locations (latitudes and longitudes) and elevations (heights) for a plurality of predetermined locations, that is, predetermined locations where the plurality of survey markers 6 are installed, in the periphery of a repair point where road repair is performed.

Figure 6A:
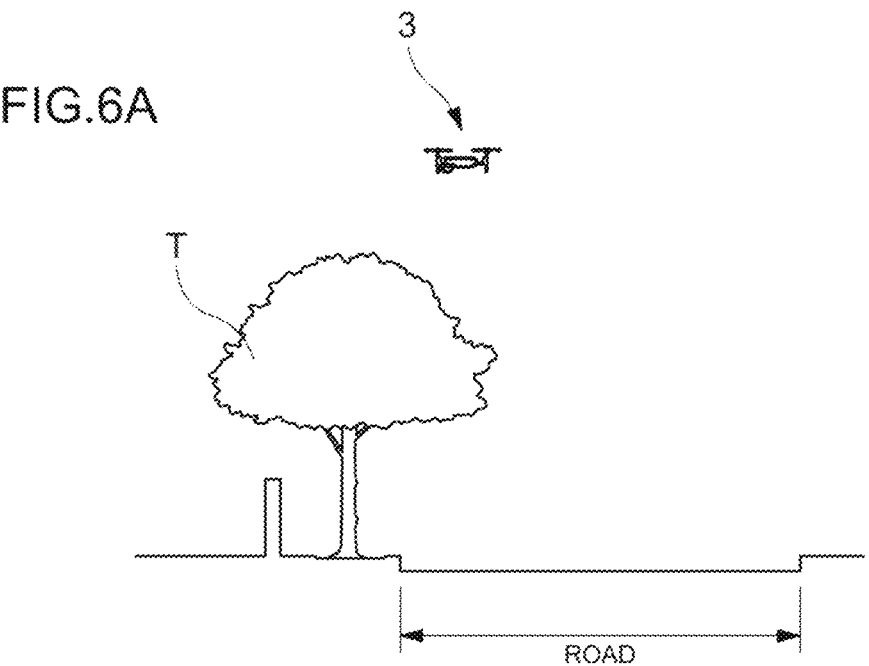
FIGS. 6A and 6B are diagrams each illustrating a UAV flying at an altitude higher than an obstacle.
Figure 6B:
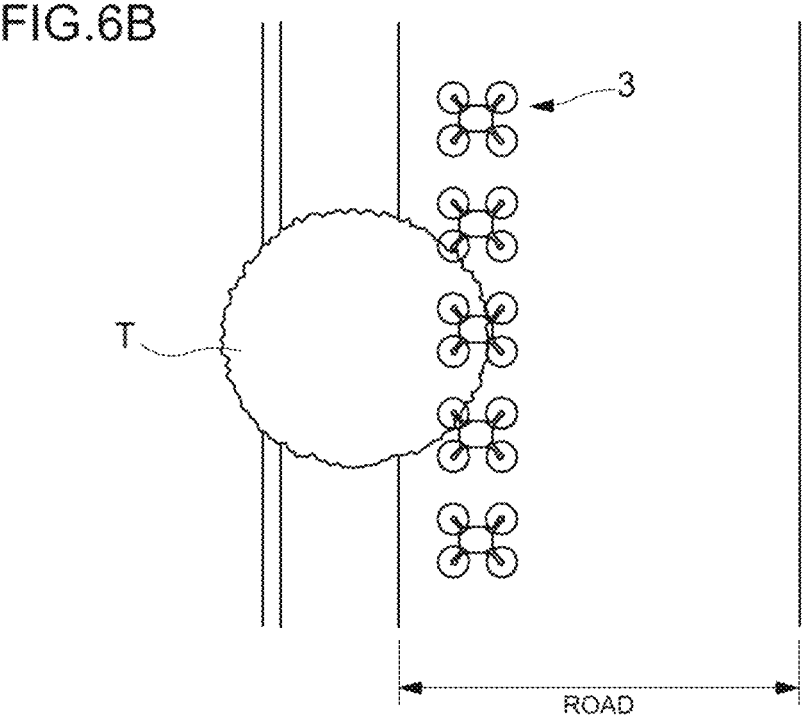

In Step S2 (first photographing step), as illustrated in FIG. 6A and FIG. 6B, the road is photographed from the sky by the UAV flying at an altitude higher than an obstacle T in the periphery of the road. FIG. 6B illustrates an example of the trajectory where the UAV 3 is flies. When photographing is performed, a plurality of survey markers 6 are previously installed at a plurality of predetermined locations where measurement is performed in Step S1. Therefore, for the plurality of survey markers 6, a plurality of photographed images are photographed such that each survey marker 6 is included in at least two of the photographed images.

Figure 7:
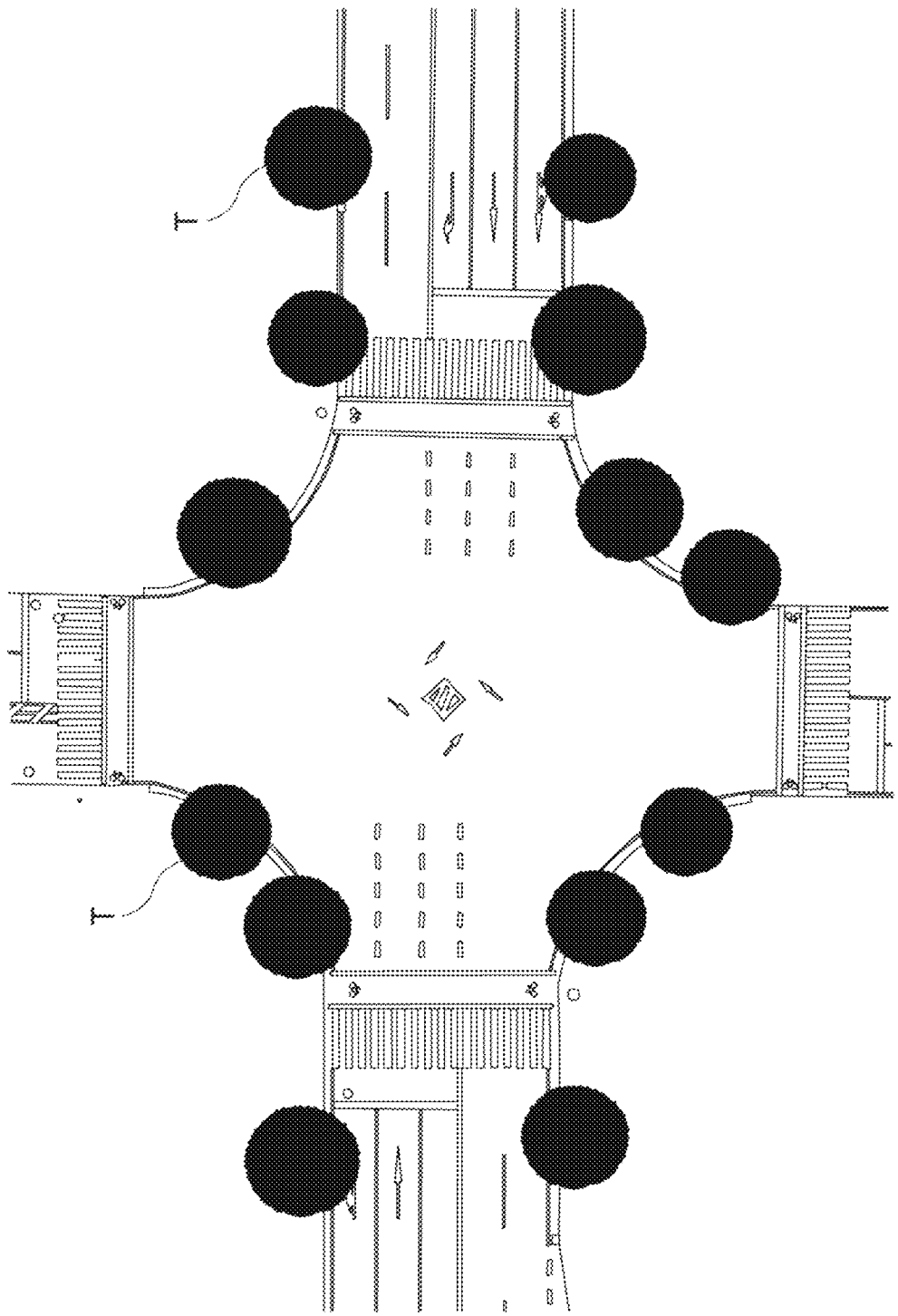
FIG. 7 is a diagram illustrating a provisional ortho-image created on the basis of photographed images photographed by the UAV flying at an altitude higher than the obstacles.

In Step S3 (first ortho-image creation step), a provisional ortho-image is created on the basis of the three-dimensional coordinates acquired by Step S1 and the plurality of photographed images photographed by Step S2. In the provisional ortho-image, the road surface is partially covered by the obstacles T, as illustrated in FIG. 7.

In Step S4, in an area where the road surface is partially covered by each obstacle T, a plurality of the survey markers 6 are installed on the road surface and on portions other than the road surface, such as side surfaces of the obstacle T, as illustrated in FIG. 8. An area covered by the obstacle T is an area that is hidden by the obstacle T when viewed from the sky. In FIG. 8, the survey markers 6 are installed on the side surface of the obstacle T on the road side.

In Step S5 (second coordinate acquisition step), the total station 2 acquires three-dimensional coordinates, that is, plane locations (latitudes and longitudes) and elevations (heights) for the predetermined locations where the plurality of survey markers 6 are installed in the area covered by each obstacle T.

Figure 9A:
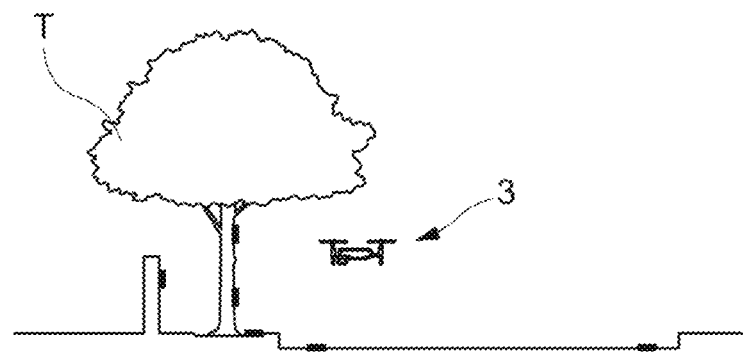
FIGS. 9A and 9B are diagrams each illustrating the UAV flying at an altitude lower than the obstacle.
Figure 9B:
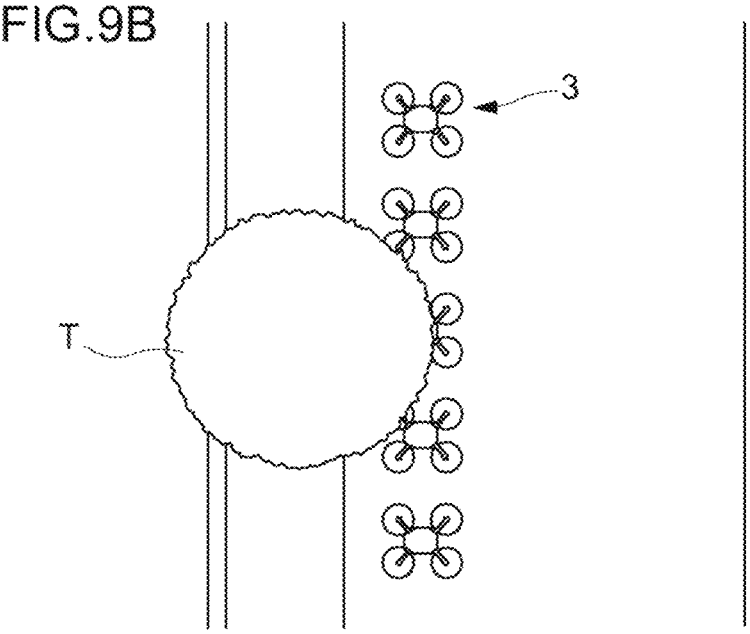

In Step S6 (second photographing step), as illustrated in FIG. 9A and FIG. 9B, the road surface and the obstacle T are photographed by the UAV 3 flying at an altitude lower than the obstacle T in the periphery of the road. FIG. 9B illustrates an example of the trajectory where the UAV 3 flies. Therefore, for the plurality of survey markers 6, a plurality of photographed images are photographed such that each survey marker 6 is included in at least two of the photographed images.

In Step S7 (shape detection step), mesh data corresponding to the shape (three-dimensional shape) of the road surface and the portion other than the road surface (including the obstacle T) in the area covered by each obstacle T is created on the basis of the plurality of second photographed images stored in the second photographed image storage unit 12b and the three-dimensional coordinates of the survey markers 6 installed in the area covered by each obstacle T stored in the second coordinate storage unit 11b.

Figure 10:
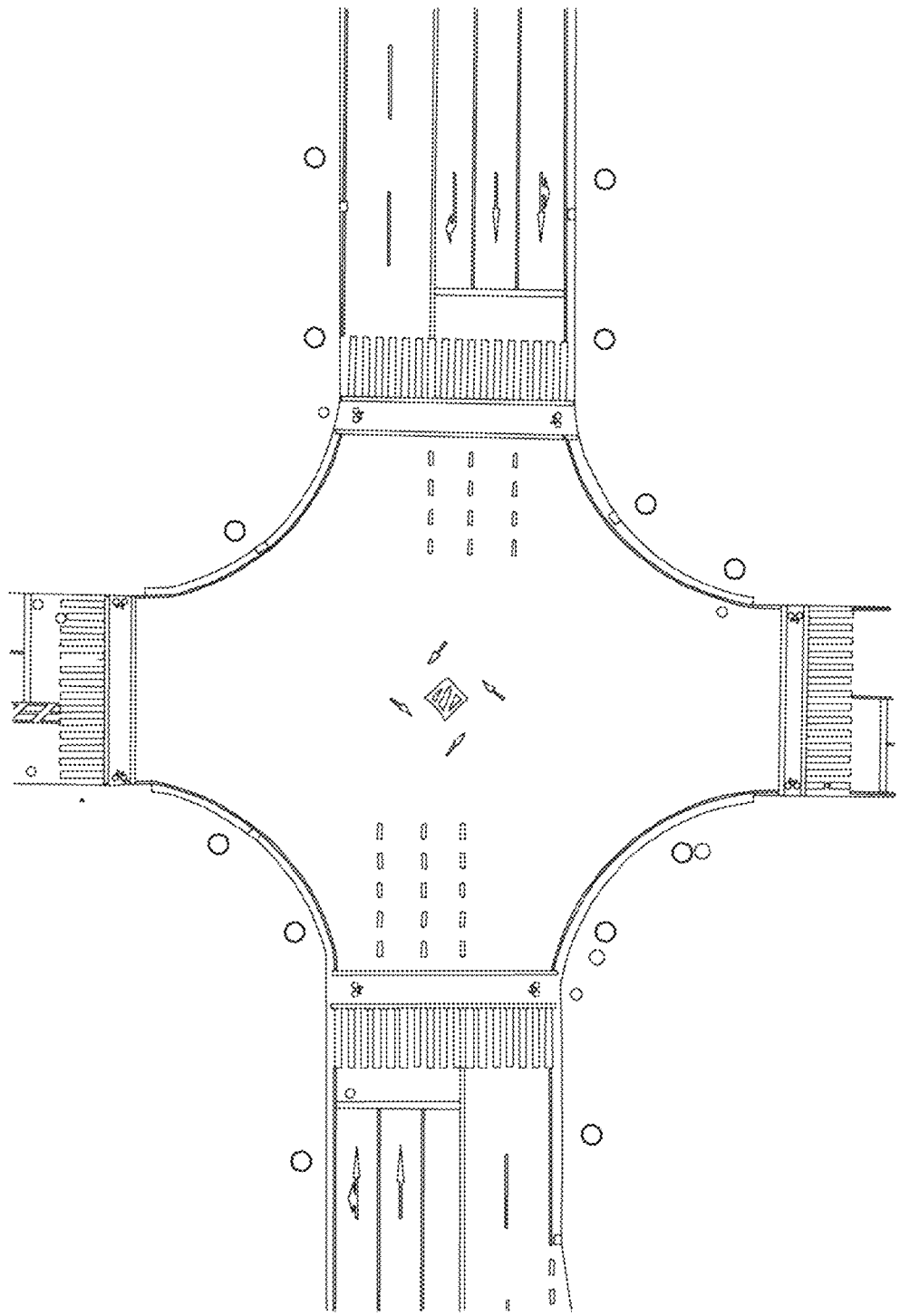
FIG. 10 is a diagram illustrating a corrected ortho-image created by removing the obstacles from the provisional ortho-image.

In Step S8 (second ortho-image creation step), as illustrated in FIG. 10, a corrected ortho-image in which the road surface is not covered by the obstacles T is created on the basis of the provisional ortho-image created by Step S3 and the mesh data corresponding to the shape of the road surface and the portion other than the road surface (including the obstacle T) in the area covered by each obstacle T created by Step S7. In the provisional ortho-image of FIG. 7, the road surface is partially covered by the obstacles T and the road surfaces in these areas are hidden, while in the corrected ortho-image of FIG. 10, the vicinities of lower ends of the obstacles T in the periphery of the road are cut away, and the road surfaces that are hidden in FIG. 7 are visible.

In Step S9 (display step) a corrected ortho-image in which the road surface is not covered by the obstacles T is displayed on the display unit 5. In this embodiment, the ground pixel size of the ortho-image is 5 mm or less.

The difference in an area to be stereoscopically created between the provisional ortho-image (FIG. 7) and the corrected ortho-image (FIG. 10) will be described with reference to FIGS. 11A, 11B, 110 and 11D.

For example, in the provisional ortho-image obtained by creating the ortho-image on the basis of the photographed image photographed by the UAV 3 flying at the higher altitude than the obstacles T in the periphery of the road, there is no photographed image of the area covered by each obstacle T, and therefore the area below the obstacle T does not take a shape, as illustrated in FIG. 11. Even if the vicinity of the lower end of the obstacle T is cut away in FIG. 11A, it is impossible to supplement the edge of the road surface (the edge on the side proximate to the obstacle T) because there is no information about the edge of the road surface, as illustrated in FIG. 11B.

Figure 11A:
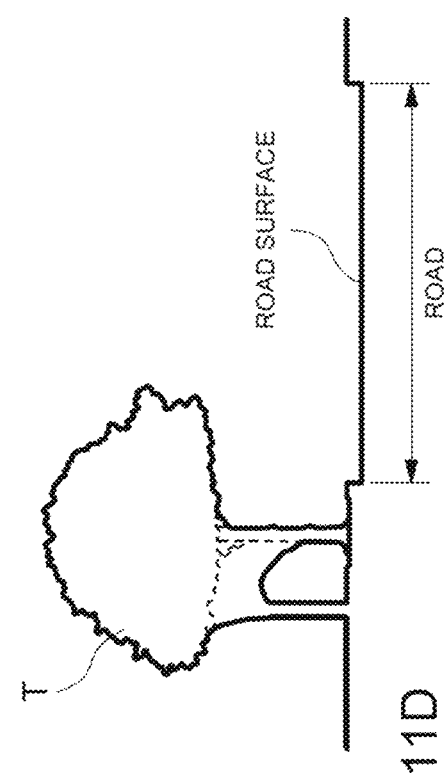
FIGS. 11A, 11B, 11C and 11D are diagrams illustrating differences in areas to be stereoscopically created between provisional ortho-images and corrected ortho-images.
Figure 11B:
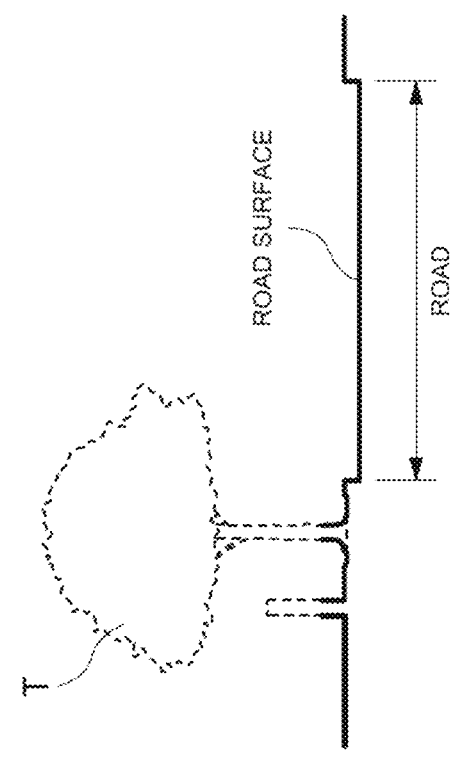
Figure 11C:
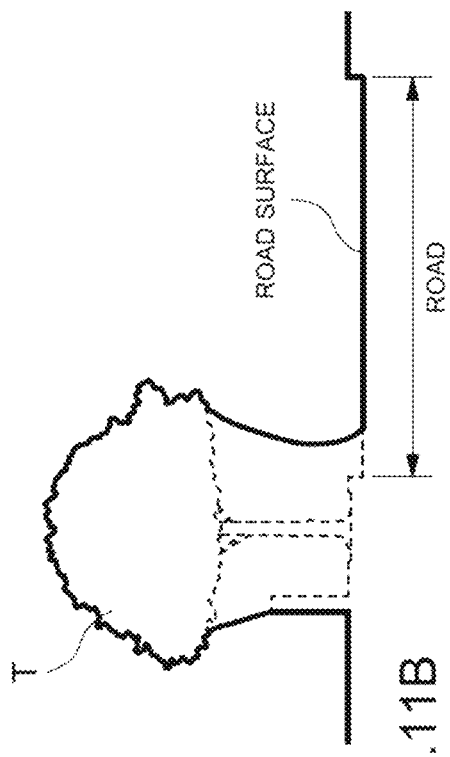
Figure 11D:
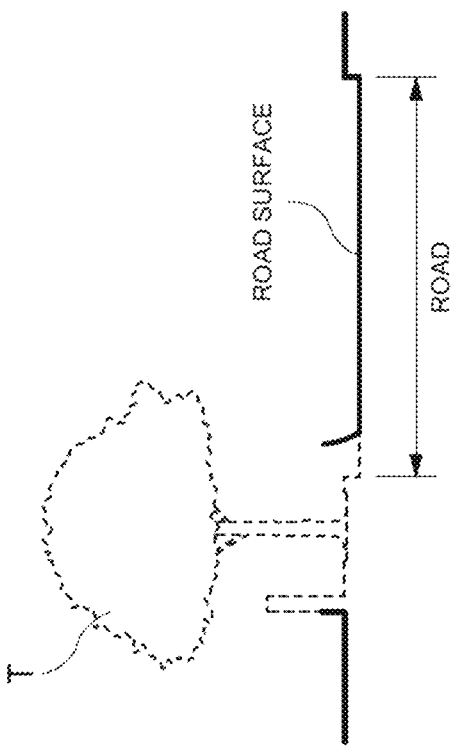

On the other hand, when the shape (mesh data) of the road surface and the portion other than the road surface (including the obstacle T) in the area covered by each obstacle T is used, the area below each obstacle T is also stereoscopically created, as illustrated in FIG. 11C Not all area below the obstacle T is stereoscopically created, but at least the area near the ground is stereoscopically created. Therefore, when the vicinity of the lower end of each obstacle T is cut away in FIG. 11C, the cut area can be corrected to an area not covered by the obstacle T by supplementing the edge of the road surface (the edge on the side near the obstacle T), as illustrated in FIG. 11D.

Road Survey Method Using Ortho-Image

The ortho-image created by the ortho-image creation apparatus 10 as described above is used for various surveys that are performed when a road is repaired.

For example, the ortho-image created by the ortho-image creation apparatus 10 can be used to (1) survey a cracking (crack) condition of a road surface, (2) survey the locations of planar elements in the periphery of a mad including an area to be repaired, (3) survey for repairing a peripheral portion of a manhole, (4) survey a distance between two designated points on a road surface, and (5) survey planar dimensions in a designated range of a mad surface, and other survey.

Figure 12:
FIG. 12 is an enlarged view of a road surface formed with cracks.
Figure 13:
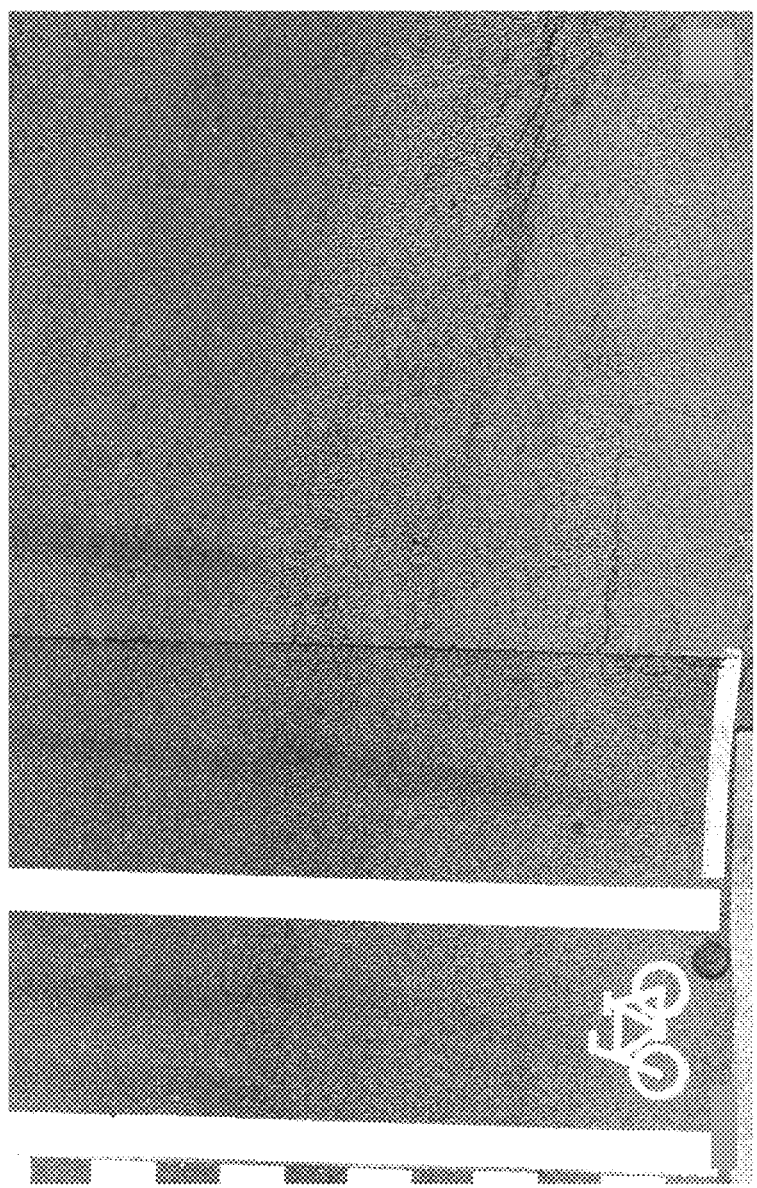
FIG. 13 is an enlarged view of a road surface formed with cracks.

FIG. 12 and FIG. 13 are each an enlarged view of a road surface formed with cracks. Thus, in the ortho-image created by the ortho-image creation apparatus 10 of this embodiment, for example, cracks formed on the mad surface can be clearly distinguished. Therefore, as a survey of the cracking condition of the mad surface, surveys as to where cracks are formed on the road surface including the repaired area where the mad repair is to be performed, and how much a cracking rate and a patching rate of the area are performed on the basis of the ortho-image displayed on the display unit 5.

As described above, when a road surface is partially covered by an obstacle when viewed from the sky, the obstacle is removed to create an ortho-image of a road having a mad surface that is not covered by the obstacle. In a process of creating the ortho-image, a three-dimensional model (three-dimensional model based on three-dimensional data (point cloud data)) is created by connecting two adjacent images on the basis of the common survey marker 6 photographed in those images by performing SfM (Structure from Motion) analysis or the like for data of a plurality of photographed images.

Creation of Three-Dimensional Model

A three-dimensional model creation system and a three-dimensional model creation method for creating three-dimensional model of a periphery of a road will be described with reference to FIG. 14 and FIG. 15. In this embodiment, a method for creating a three-dimensional model of a road, a road surface of which is not covered by any obstacle when there is an obstacle in the periphery of the road and the road surface is partially covered by an obstacle as viewed from the sky will be described.

Figure 14:
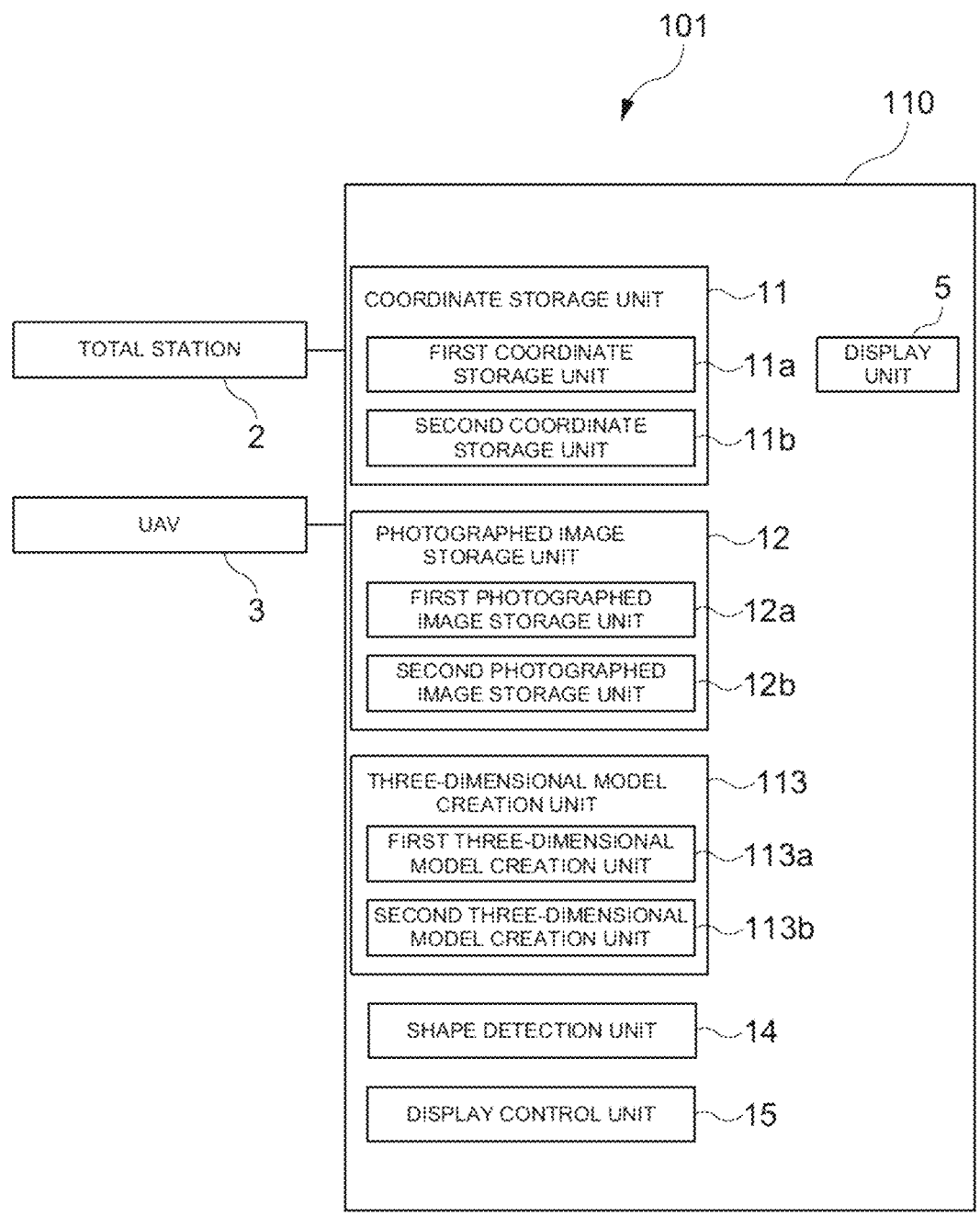
FIG. 14 is a diagram illustrating a schematic configuration of a three-dimensional model creation system according to an embodiment of the present invention.

As illustrated in FIG. 14, a three-dimensional model creation system 101 according to an embodiment of the present invention has a total station 2 installed at a known point (e.g., a reference point), a UAV 3 (Unmanned Aerial Vehicle) which is an unmanned aircraft as a photographing apparatus, and an ortho-image creation apparatus 110 wirelessly connected to the total station 2 and the UAV 3.

That is, when the following contents are changed in the ortho-image creation system illustrated in FIG. 1, a three-dimensional model creation system for creating a three-dimensional model by a three-dimensional model creation method of this embodiment is shown as illustrated in FIG. 14.

The ortho-image creation unit 13 is changed to a three-dimensional model creation unit 113 that creates a three-dimensional model.

The first ortho-image creation unit 13a is changed to a first three-dimensional model creation unit 113a that creates a provisional three-dimensional model.

The second ortho-image creation unit 13b is changed to a second three-dimensional model creation unit 113b that creates a corrected three-dimensional model.

Figure 5:
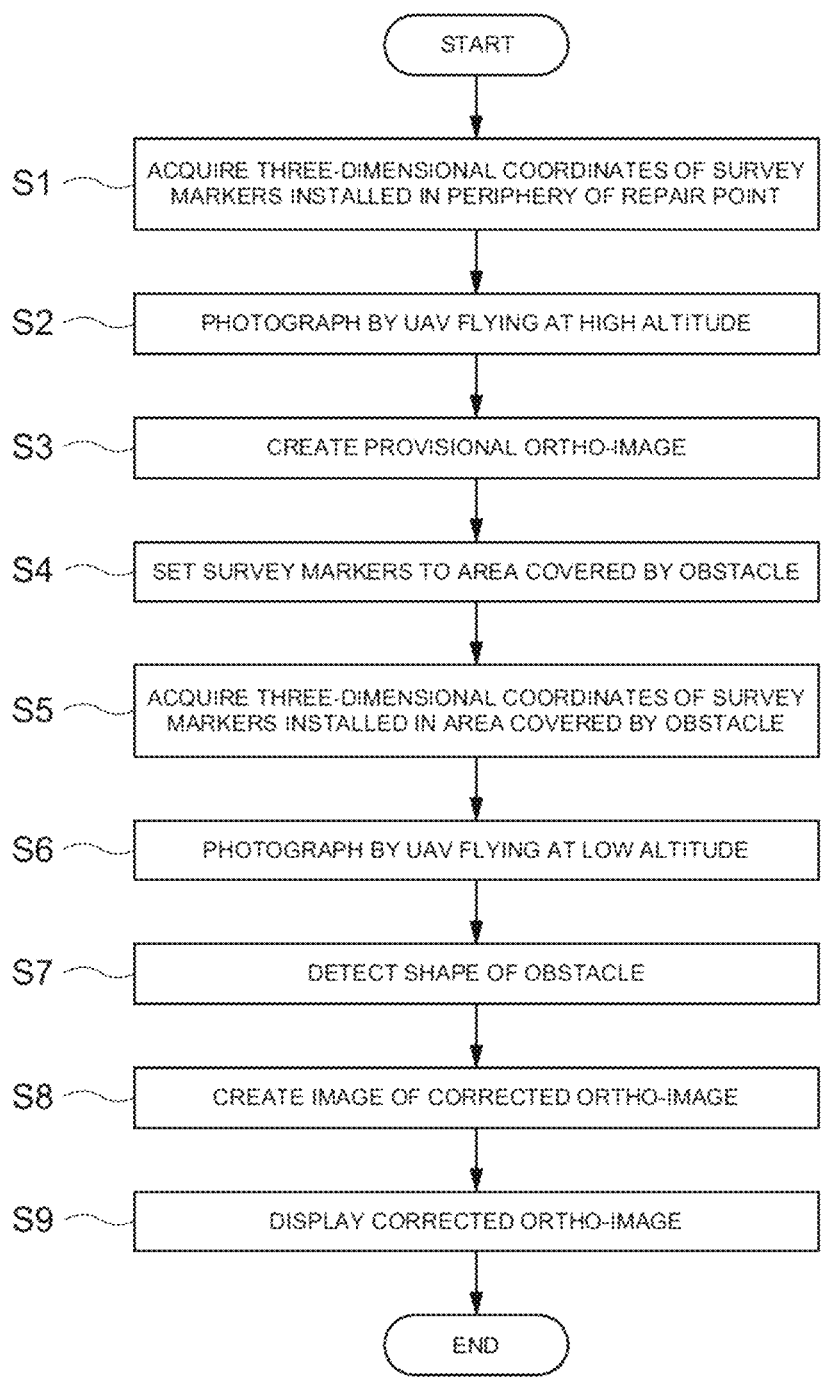
FIG. 5 is a diagram illustrating a creation method for creating an ortho-image in an ortho-image creation apparatus.
Figure 15:
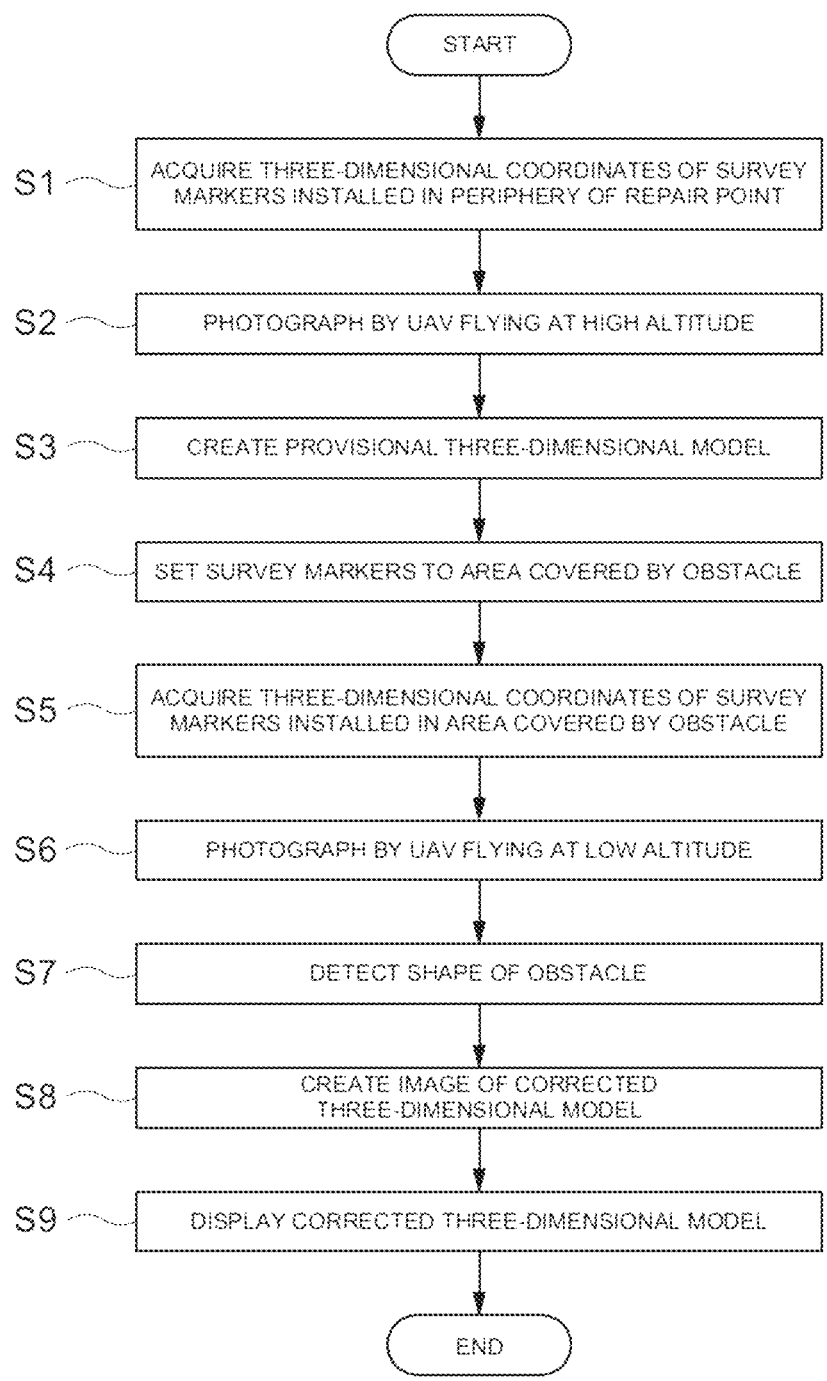
FIG. 15 is a diagram illustrating a creation method for creating a three-dimensional model in the three-dimensional model creation apparatus.

When the following contents are changed in the ortho-image creation method illustrated in FIG. 5, the three-dimensional model creation method of this embodiment is shown as illustrated in FIG. 15.

Step S3: Change the creation of a provisional ortho-image to the creation of a provisional three-dimensional model.

Step S8: Change the creation of a corrected ortho-image to the creation of a corrected three-dimensional model.

Step S9: Change the display of a corrected ortho-image to the display of a corrected three-dimensional model.

As described above, the corrected ortho-image in which the road surface is not covered by the obstacle T is created on the basis of the provisional ortho-image in which the road surface is partially covered by the obstacle T and the mesh data corresponding to the shape of the road surface and the portion other than the road surface (including the obstacle T) in the area covered by the obstacle T. In the same way, the corrected three-dimensional model in which the road surface is not covered by the obstacle T is created on the basis of the provisional three-dimensional model in which the road surface is partially covered by the obstacle T and the point cloud data corresponding to the shape of the road surface and the portion other than the road surface (including the obstacle T) in the area covered by the obstacle T, and therefore, the detailed description thereof will be omitted. Therefore, in the three-dimensional model creation system 101 illustrated in 14, the shape detection unit 14 creates point cloud data corresponding to the shape (three-dimensional shape) of the road surface and the portion other than the road surface (including obstacle) in the area covered by the obstacle on the basis of a plurality of second photographed images stored in a second photographed image storage unit 12b and three-dimensional coordinates of a survey marker 6 installed in the area covered by the obstacle stored in the second coordinate storage unit 11b.

In the method for creating a correction three-dimensional model of this embodiment, the provisional three-dimensional model is used as a background, a three-dimensional model for correction (mesh data) is created on the background, and the three-dimensional model for correction is integrated with the provisional three-dimensional model to create the corrected three-dimensional model. Therefore, the integration method for creating a corrected three-dimensional model of this embodiment corresponds to (Integration Method 1 for Creating Corrected Three-dimensional Model) described below.

For example, by rotating the three-dimensional model of the road surface on the display screen, it is possible to change the road surface to the three-dimensional model viewed from various directions. In the following description, a case where the three-dimensional model of the road surface is viewed from various directions will be described.

Figure 16:
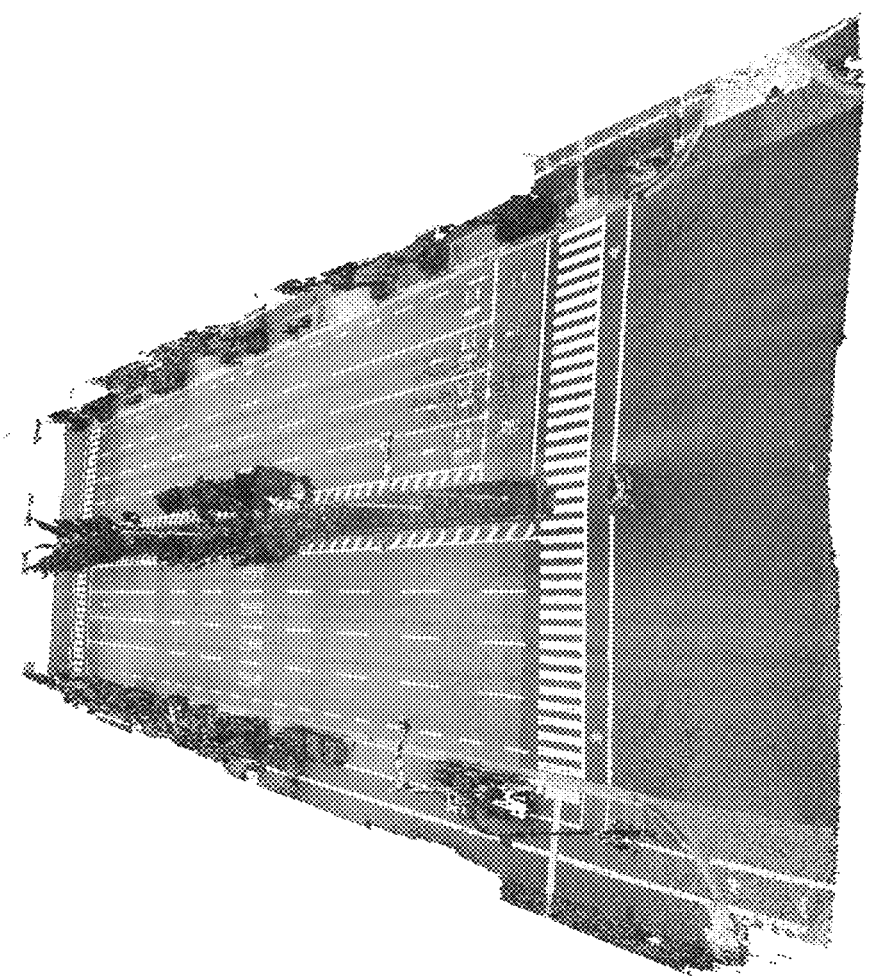
FIG. 16 is a three-dimensional model of a road surface when a road surface is photographed from the sky.
Figure 17:
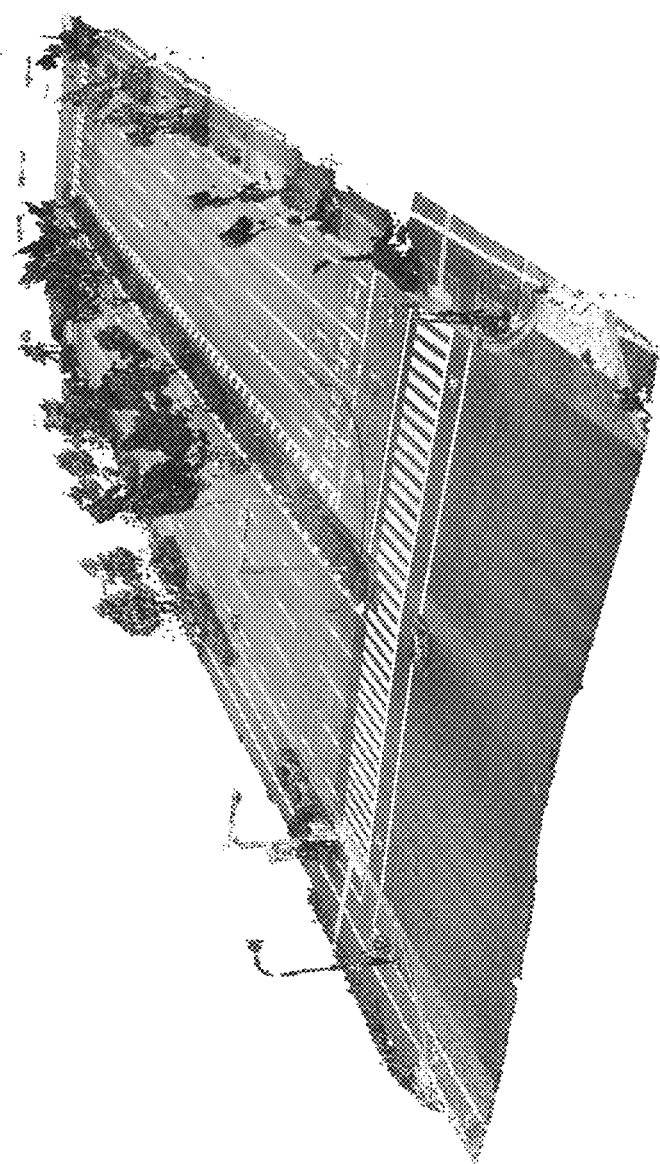
FIG. 17 is a three-dimensional model of a road surface when a road surface is photographed from the sky.

FIG. 16 and FIG. 17 are three-dimensional models each illustrating a state in which a road surface is partially covered by obstacles such as street trees, traffic lights and road markers when the road surface is photographed from the sky. Therefore, in FIG. 16 and FIG. 17, the road surface is partially hidden by the obstacles, and the road surface is not partially viewed.

Figure 18:
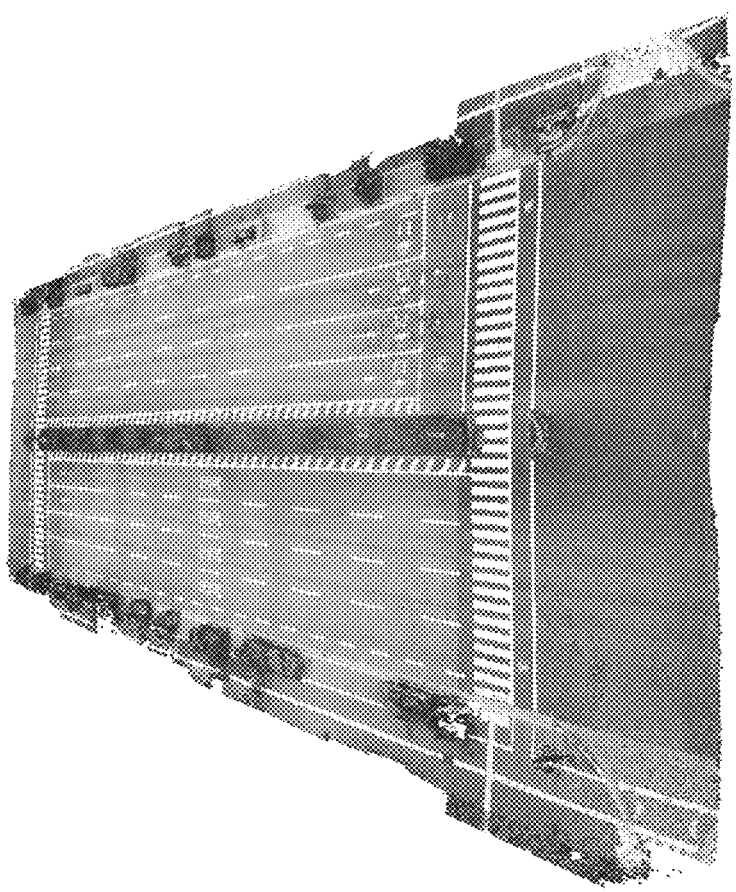
FIG. 18 is a three-dimensional model of a road surface illustrating a state in which the obstacle is removed from the three-dimensional model of FIG. 16.
Figure 19:
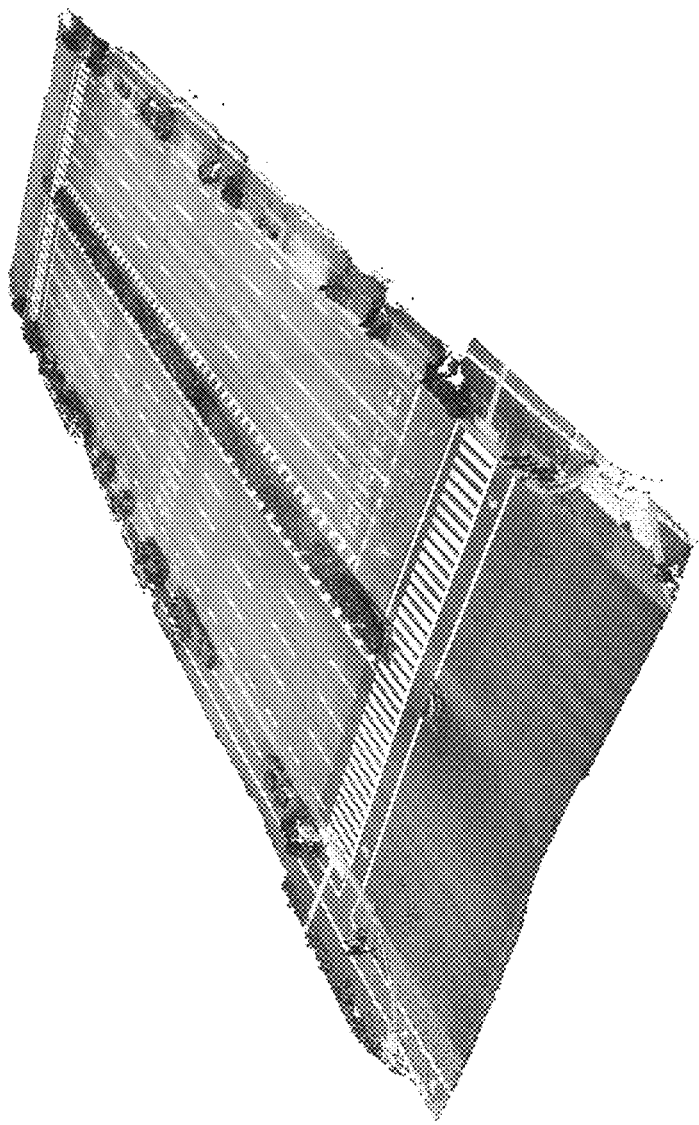
FIG. 19 is a three-dimensional model of a road surface illustrating a state in which the obstacle is removed from the three-dimensional model of FIG. 17.

In contrast, FIG. 18 and FIG. 19 are three-dimensional models each illustrating a state in which the obstacles such as the street trees, the traffic lights and the road markers that partially cover the road surface are removed when the road surface is photographed from the sky. Therefore, in FIG. 18 and FIG. 19, portions hidden by the obstacles in the road surface in FIG. 16 and FIG. 17 are visible.

Figure 20:
FIG. 20 is a three-dimensional model of a road surface when the road surface is photographed from the sky.
Figure 21:
FIG. 21 is a three-dimensional model of a road surface illustrating a state in which the obstacle is removed from the three-dimensional model of FIG. 20.

FIG. 20 is a three-dimensional model created when the road surface is photographed from the photographing direction different from the photographing directions in FIG. 16 and FIG. 17. In FIG. 20, a large part of the road surface is hidden by the street trees. In contrast, FIG. 21 is a three-dimensional model illustrating a state in which the street trees are removed from FIG. 20. In FIG. 21, the large part hidden by the street trees in the road surface in FIG. 20 is visible.

Therefore, the entire road surface is visible in FIG. 18, FIG. 19 and FIG. 21, and therefore it is possible to survey the width of the road (locations of the edges of the road) and the locations of planar elements including compartment lines such as lane markings lines.

The ortho-image creation method of this embodiment includes: the first photographing step of photographing a road, a road surface of which is partially covered by an obstacle when viewed from the sky, from an altitude higher than the obstacle by a first photographing apparatus (UAV 3), and obtaining a plurality of the first photographed images; the second photographing step of photographing an area covered by the obstacle from an altitude lower than the obstacle by a second photographing apparatus (UAV 3), and obtaining a plurality of the second photographed images; the first coordinate acquisition step of acquiring the three-dimensional coordinates of the first feature point located outside the area covered by the obstacle and included in at least two of the plurality of first photographed images; the second coordinate acquisition step of acquiring the three-dimensional coordinates of the second feature point located in the area covered by the obstacle and included in at least two of the plurality of second photographed images; and the ortho-image creation step of creating the corrected ortho-image obtained by correcting at least a part of the area covered by the obstacle in the road surface to an area not covered by the obstacle, on the basis of the plurality of first photographed images photographed by the first photographing step, the plurality of second photographed images photographed by the second photographing step, the three-dimensional coordinates of the first feature point acquired by the first coordinate acquisition step, and the three-dimensional coordinates of the second feature point acquired by the second coordinate acquisition step.

The ortho-image creation system 1 of this embodiment includes: the first photographed image storage unit 12a that stores a plurality of the first photographed images obtained by photographing a road, a road surface of which is partially covered by an obstacle when viewed from the sky, from an altitude higher than the obstacle by a first photographing apparatus UAV 3); the second photographed image storage unit 12b that stores a plurality of the second photographed images obtained by photographing an area covered by the obstacle from an altitude lower than the obstacle by a second photographing apparatus UAV 3); the first coordinate storage unit 11a that stores the three-dimensional coordinates of the first feature point located outside the area covered by the obstacle and included in at least two of the plurality of first photographed images; the second coordinate storage unit 11b that stores the three-dimensional coordinates of the second feature point located in the area covered by the obstacle and included in at least two of the plurality of second photographed images; and the ortho-image creation unit 13 that creates the corrected ortho-image obtained by correcting at least a part of the area covered by the obstacle in the road surface to an area not covered by the obstacle, on the basis of the plurality of first photographed images stored in the first photographed image storage unit 12a, the plurality of second photographed images stored in the second photographed image storage unit 12b, the three-dimensional coordinates of the first feature point stored in the first coordinate storage unit 11a, and the three-dimensional coordinates of the second feature point stored in the second coordinate storage unit 11b.

Consequently, in the ortho-image creation method and the ortho-image creation system 1 of this embodiment, even when the road surface is partially covered by the obstacle when viewed from the it is possible to create the corrected ortho-image obtained by correcting the area partially covered by the obstacle in the road surface to the area not covered by the obstacle. Therefore, even when there is the obstacle that partially covers the road surface, it is possible to easily survey a road condition at the time of repair construction on the basis of the photographed images photographed from the sky.

In the ortho-image creation method of this embodiment, the ortho-image creation step includes: the first ortho-image creation step of creating the provisional ortho-image in which the road surface is partially covered by the obstacle, on the basis of the plurality of first photographed images photographed by the first photographing step, and the three-dimensional coordinates of the first feature point acquired by the first coordinate acquisition step; the shape detection step of detecting a shape of the road surface and at least a part of a portion other than the road surface in the area covered by the obstacle, on the basis of the plurality of second photographed images photographed by the second photographing step and the three-dimensional coordinates of the second feature point acquired by the second coordinate acquisition step; and the second ortho-image creation step of creating the corrected ortho-image obtained by correcting at least a part of an area covered by the obstacle in the provisional ortho-image created by the first ortho-image creation step to an area not covered by the obstacle.

In the ortho-image creation system 1 of this embodiment, the ortho-image creation unit 13 includes: the first ortho-image creation unit 13a that creates the provisional ortho-image in which the road surface is partially covered by the obstacle, on the basis of the plurality of first photographed images stored in the first photographed image storage unit 12*a*, and the three-dimensional coordinates of the first feature point stored in the first coordinate storage unit 11*a*; the shape detection unit 14 that detects a shape of the road surface and at least a part of a portion other than the road surface in the area covered by the obstacle, on the basis of the plurality of second photographed images stored in the second photographed image storage unit 12*b* and the three-dimensional coordinates of the second feature point stored in the second coordinate storage unit 11*b*; and the second ortho-image creation unit 13*b* that creates the corrected ortho-image obtained by correcting at least a part of an area covered by the obstacle in the provisional ortho-image created by the first ortho-image creation unit 13*a* to an area not covered by the obstacle.

Consequently, in the ortho-image creation method and the ortho-image creation system 1 according to the present invention, even when the road surface is partially covered by the obstacle when viewed from the sky, it is possible to create the corrected ortho-image obtained by correcting the area partially covered by the obstacle in the road surface in the provisional ortho-image to the area not covered by the obstacle. Therefore, even when there is the obstacle that partially covers the road surface, it is possible to easily survey a road condition at the time of repair construction on the basis of the photographed images photographed from the sky.

In the ortho-image creation method of this embodiment, the first photographing apparatus is the UAV 3 that flies at the altitude higher than the obstacle, and the second photographing apparatus is the UAV 3 that flies at the altitude lower than the obstacle.

In the ortho-image creation system 1 of this embodiment, the first photographing apparatus is the UAV 3 that flies at the altitude higher than the obstacle, and the second photographing apparatus is the UAV 3 that flies at the altitude lower than the obstacle.

Consequently, in the ortho-image creation method and the ortho-image creation system 1 of this embodiment, the plurality of first photographed images obtained by photographing the road surface not covered by the obstacle from the altitude higher than the obstacle, and the plurality of second photographed images obtained by photographing the road surface covered by the obstacle from the altitude lower than the obstacle can be easily obtained by the UAV 3.

In the ortho-image creation method of this embodiment, in the second photographing step, a plurality of the survey markers 6 are installed on the road surface and the obstacle in the area covered by the obstacle, and photographing is performed such that each of the plurality of survey markers 6 is included as the second feature point in at least two of the second photographed images.

In the ortho-image creation system 1 of this embodiment, the plurality of second photographed images stored in the second photographed image storage unit 12*b* are photographed such that each of the plurality of survey markers 6 installed on the road surface and the obstacle in the area covered by the obstacle is included as the second feature point in at least two of the second photographed images.

Consequently, in the ortho-image creation method and the ortho-image creation system 1 of this embodiment, the shape of the road surface and the obstacle in the area covered by the obstacle can be precisely grasped by the plurality of second photographed images photographed from the altitude lower than the obstacle.

Each of the survey markers 6 of this embodiment is a marker used for the ortho-image creation method of this embodiment, the marker being a seal-like marker having a back surface formed with an adhesive layer. Consequently, in each survey marker 6 of this embodiment, the marker can be easily fixed at the installation place.

Each of the survey markers 6 of this embodiment is a marker used for the ortho-image creation system 1 of this embodiment, the marker being a seal-like marker having a back surface formed with an adhesive layer. Consequently, in each survey marker 6 of this embodiment, the marker can be easily fixed at the installation place.

The three-dimensional model creation method of this embodiment includes: the first photographing step of photographing a road, a road surface of which is partially covered by an obstacle when viewed from the sky; from an altitude higher than the obstacle by a first photographing apparatus (UAV 3), and obtaining a plurality of the first photographed images; the second photographing step of photographing an area covered by the obstacle from an altitude lower than the obstacle by a second photographing apparatus (UAV 3), and obtaining a plurality of the second photographed images; the first coordinate acquisition step of acquiring the three-dimensional coordinates of the first feature point located outside the area covered by the obstacle and included in at least two of the plurality of first photographed images; the second coordinate acquisition step of acquiring the three-dimensional coordinates of the second feature point located in the area covered by the obstacle and included in at least two of the plurality of second photographed images; and the three-dimensional model creation step of creating the corrected three-dimensional model obtained by correcting at least a part of the area covered by the obstacle in the road surface to an area not covered by the obstacle, on the bass of the plurality of first photographed images photographed by the first photographing step, the plurality of second photographed images photographed by the second photographing step, the three-dimensional coordinates of the first feature point acquired by the first coordinate acquisition step, and the three-dimensional coordinates of the second feature point acquired by the second coordinate acquisition step.

The three-dimensional model creation system 101 of this embodiment includes: the first photographed image storage unit 12*a* that stores a plurality of the first photographed images obtained by photographing a road, a road surface of which is partially covered by an obstacle when viewed from the sky, from an altitude higher than the obstacle by a first photographing apparatus (UAV 3); the second photographed image storage unit 12*b* that stores a plurality of the second photographed images obtained by photographing an area covered by the obstacle from an altitude lower than the obstacle by a second photographing apparatus (UAV 3); the first coordinate storage unit 11*a* that stores the three-dimensional coordinates of the first feature point located outside the area covered by the obstacle and included in at least two of the plurality of first photographed images; the second coordinate storage unit 11*b* that stores the three-dimensional coordinates of the second feature point located in the area covered by the obstacle and included in at least two of the plurality of second photographed images; and the three-dimensional model creation unit 113 that creates the corrected three-dimensional model obtained by correcting at least a part of the area covered by the obstacle in the road surface to an area not covered by the obstacle, on the basis of the plurality of first photographed images stored in the first photographed image storage unit 12*a*, the plurality of second photographed images stored in the second photographed image storage unit 12b, the three-dimensional coordinates of the first feature point stored in the first coordinate storage unit 11a, and the three-dimensional coordinates of the second feature point stored in the second coordinate storage unit 11b.

Consequently, in the three-dimensional model creation method and the three-dimensional model creation system 101 of this embodiment, even when the road surface is partially covered by the obstacle when viewed from the sky, it is possible to create the corrected three-dimensional model obtained by correcting the area partially covered by the obstacle in the road surface to the area not covered by the obstacle. Therefore, even when there is the obstacle that partially covers the road surface, it is possible to survey the width of the road (the locations of the edges of the road) and the locations of planar elements including compartment lines such as lane marking lines at the time of repair construction on the basis of the photographed images photographed from the sky.

In the three-dimensional model creation method of this embodiment, the three-dimensional model creation step includes: the first three-dimensional model creation step of creating the provisional three-dimensional model in which the road surface is partially covered by the obstacle, on the basis of the plurality of first photographed images photographed by the first photographing step, and the three-dimensional coordinates of the first feature point acquired by the first coordinate acquisition step; the shape detection step of detecting a shape of the road surface and at least a part of a portion other than the road surface in the area covered by the obstacle, on the basis of the plurality of second photographed images photographed by the second photographing step and the three-dimensional coordinates of the second feature point acquired by the second coordinate acquisition step; and the second three-dimensional model creation step of creating the corrected three-dimensional model obtained by correcting at least a part of an area covered by the obstacle in the provisional three-dimensional model created by the first three-dimensional model creation step to an area not covered by the obstacle.

In the three-dimensional model creation system 101 of this embodiment, the three-dimensional model creation unit 113 includes: the first three-dimensional model creation unit 113a that creates the provisional ortho-image in which the road surface is partially covered by the obstacle, on the basis of the plurality of first photographed images stored in the first photographed image storage unit 12a, and the three-dimensional coordinates of the first feature point stored in the first coordinate storage unit 11a; the shape detection unit 14 that detects a shape of the road surface and at least a part of a portion other than the road surface in the area covered by the obstacle, on the basis of the plurality of second photographed images stored in the second photographed image storage unit 12b and the three-dimensional coordinates of the second feature point stored in the second coordinate storage unit 11b; and the second three-dimensional model creation unit 113b that creates the corrected three-dimensional model obtained by correcting at least a part of an area covered by the obstacle in the provisional three-dimensional model created by the first three-dimensional model creation unit 113a to an area not covered by the obstacle.

Consequently, in the three-dimensional model creation method and the three-dimensional model creation system 101 according to the present invention, even when the road surface is partially covered by the obstacle when viewed from the sky, it is possible to create the corrected three-dimensional model obtained by correcting the area partially covered by the obstacle in the road surface in provisional three-dimensional mode to the area not covered by the obstacle. Therefore, even when there is the obstacle that partially covers the road surface, it is possible to survey the width of the road (the locations of the edges of the road) and the locations of planar elements including compartment lines such as lane marking lines at the time of repair construction on the basis of the photographed images photographed from the sky.

In the three-dimensional model creation method of this embodiment, the first photographing apparatus is the UAV 3 that flies at the altitude higher than the obstacle, and the second photographing apparatus is the UAV 3 that flies at the altitude lower than the obstacle.

In the three-dimensional model creation system 101 of this embodiment, the first photographing apparatus is the UAV 3 that flies at the altitude higher than the obstacle, and the second photographing apparatus is the UAV 3 that flies at the altitude lower than the obstacle.

Consequently, in the three-dimensional model creation method and the three-dimensional model creation system 101 of this embodiment, the plurality of first photographed images obtained by photographing the road surface not covered by the obstacle from the altitude higher than the obstacle, and the plurality of second photographed images obtained by photographing the road surface covered by the obstacle from the altitude lower than the obstacle can be easily obtained by the obstacle from the altitude lower than the obstacle can be easily obtained by the UAV 3.

In the three-dimensional model creation method of this embodiment, in the second photographing step, the plurality of survey markers 6 are installed on the road surface and the obstacle in the area covered by the obstacle, and photographing is performed such that each of the plurality of survey markers 6 is included as the second feature point in at least two of the second photographed images.

In the three-dimensional model creation system 101 of this embodiment, the plurality of second photographed images stored in the second photographed image storage unit 12b are photographed such that each of the plurality of survey markers 6 installed on the road surface and the obstacle in the area covered by the obstacle is included as the second feature point in at least two of the second photographed images.

Consequently, in the three-dimensional model creation method and the three-dimensional model creation system 101 of this embodiment, the shape of the road surface and the obstacle in the area covered by the obstacle can be precisely grasped by the plurality of second photographed images photographed from the altitude lower than the obstacle.

Each of the survey markers 6 of this embodiment is a marker used for the three-dimensional model creation method of this embodiment, the marker being a seal-like marker having a back surface formed with an adhesive layer. Consequently, in each survey marker 6 of this embodiment, the marker can be easily fixed at the installation place.

Each of the survey markers 6 of this embodiment is a marker used for the three-dimensional model creation system 101 of this embodiment, the marker being a seal-like marker having a back surface formed with an adhesive layer. Consequently, in each survey marker 6 of this embodiment, the marker can be easily fixed at the installation place.

Although the embodiments of the present invention are described above, the specific configuration of each unit is not limited to the above embodiments, and various variations are possible without departing from the spirits of the present invention.

In the above embodiment, the three-dimensional model and the ortho-image are created on the basis of the photographed images photographed from the sky above the road by the UAV 3 flying at an almost constant altitude of 20 meters or less above the ground, but the present invention includes creating the three-dimensional model and the ortho-image on the basis of photographed images photographed from the sky above the road by the UAV 3 flying at an altitude exceeding 20 meters above the ground.

In the above embodiment, the three-dimensional coordinates of each survey marker 6 are acquired by the total station 2. However, the three-dimensional coordinates of each survey marker 6 may be acquired by a GNSS (Global Navigation Satellite System) which is a positioning system using satellites such as a GPS, for example. The three-dimensional coordinates of the survey marker 6 may be acquired by scanning of a 3D scanner 4. The three-dimensional coordinates of each survey marker 6 installed in the periphery of the road may be acquired by scanning of the 3D scanner 4. The three-dimensional coordinates at the predetermined locations where the plurality of survey markers 6 are installed are acquired by the total station 2. However, when the three-dimensional coordinates at the predetermined locations are already acquired, the three-dimensional coordinates may be acquired.

In the above embodiment, each survey marker 6 has a square and has a pattern that makes the center location used as the rating point clear. However, the shape of the survey marker 6 and the center location of the survey marker 6 are not limited to a case where the shape of the survey marker 6 and the center location of the survey marker 6 are characteristic points. The survey marker 6 has a pattern that identifies a location other than the center location thereof, and the location other than the center location thereof may be used as a rating point.

In the above embodiment, the plate-like survey markers 6 are installed on the road surface and the like, but a pattern similar to each survey marker 6 may be formed on the road surface and the like by any material such as paint, instead of use of the plate-like survey marker 6. For example, a pattern of the same shape as white portions in the survey marker 6 of FIG. 3 may be sprayed on an asphalt surface of a road with paint of a different color from the asphalt surface, and the pattern similar to the survey marker 6 may be formed. When the survey marker is formed on the road surface by any material such as paint, the type, the shape, the size, and the pattern of the survey marker are also optional. The above also applies to a case where the survey marker is fixed to an obstacle such as a street tree, for example.

In the above embodiment, the seal-like survey marker 6 attached with the backing paper so as to cover the adhesive layer on the back surface is used, and fixed at the installation place by removing and adhering the backing paper at the installation place. However, the method of fixing the survey marker 6 at the installation place is optional. For example, a survey marker formed with a hole may be fixed at an installation place by a fixture (such as an anchor pin). In such a case, a mounting hole may be formed at the installation place such as a road surface, and the survey marker may be fixed to the mounting holes with a fixture. For example, a rod-shaped marker pile having a tip formed with a survey marker may be embedded at an installation place and fixed at the installation place. In that case, the survey marker formed on the tip of the marker pile is disposed on the ground surface by embedding the marker pile in a ground surface or the like. The above also applies to a case where the survey marker is fixed to an obstacle such as a street tree, for example.

In the above embodiment, the method of creating an ortho-image is described. It is possible to photograph the photographed images after the acquisition of the three-dimensional coordinates of the survey markers 6, as well as to acquire the three-dimensional coordinates of the survey markers 6 after photograph the photographed images.

In the above embodiment, when the road surface is partially covered by the obstacles when viewed from the sky, the corrected three-dimensional model and the corrected ortho-image obtained by correcting all area covered by the obstacle to the area not covered by the obstacles are created. However, a corrected three-dimensional model and a corrected ortho-image obtained by correcting a part of an area covered by an obstacle (e.g., at least a part of a road surface and a part of a portion other than the road surface) to an area not covered by the obstacle may be created. Therefore, a corrected three-dimensional model and a corrected ortho-image obtained by correcting a road surface in an area covered by an obstacle to an area not covered by an obstacle, and not correcting part of a portion other than the road surface in the area covered by the obstacle to area not covered by the obstacle may be created.

In the above embodiment the unmanned aerial vehicle (including the photographing apparatus) that flies at an altitude higher than obstacle and the unmanned aerial vehicle (including the photographing apparatus) that flies at an altitude lower than the obstacle are used as the first photographing apparatus and the second photographing apparatus. However, the present invention is not limited to this. In the present invention, the types of the first photographing apparatus and the second photographing apparatus are optional. For example, in at least one of a case of photographing a road from an altitude higher than an obstacle and a case of photographing the road from an altitude lower than the obstacle, as the first photographing apparatus and second photographing apparatus, the road may be photographed by a model aircraft (including the photographing apparatus) that flies at an altitude higher than an obstacle or a model aircraft (including the photographing apparatus) that flies at an altitude lower than the obstacle. In the present invention, the unmanned aerial vehicle is an airplane, a rotorcraft, an airship, or the like which cannot be boarded by a person, and which can be flown by remote control or automatic control, such as a drone (multicopter), a radio-controlled plane, or the like. The model aircraft is, for example, a multicopter, radio-controlled plane, or the like, and weighs less than 200 grams, which is the sum of the weight of an aircraft body and the weight of a battery. In the above embodiment, when a road is photographed by an unmanned aerial vehicle flying in the sky, an obstacle that partially covers a road surface is not limited to a street tree in the periphery of the road. The present invention is applicable to, for example, a case where an obstacle such as a pedestrian bridge and a traffic light disposed above a road surface partially covers the road surface.

In the above embodiment, the unmanned aerial vehicle (including the photographing apparatus) that flies at the altitude higher than the obstacle, and the unmanned aerial vehicle (including the photographing apparatus) that flies at the altitude lower than the obstacle are used as the first photographing apparatus and the second photographing apparatus. However, the present invention is not limited to this. For example, in at least one of a case of photographing a road from an altitude higher than an obstacle and a case of photographing the road from an altitude lower than the obstacle, as the first photographing apparatus and second photographing apparatus, a road may be photographed by a camera disposed at an altitude higher than an obstacle or a camera disposed at an altitude lower than the obstacle.

Figure 22:
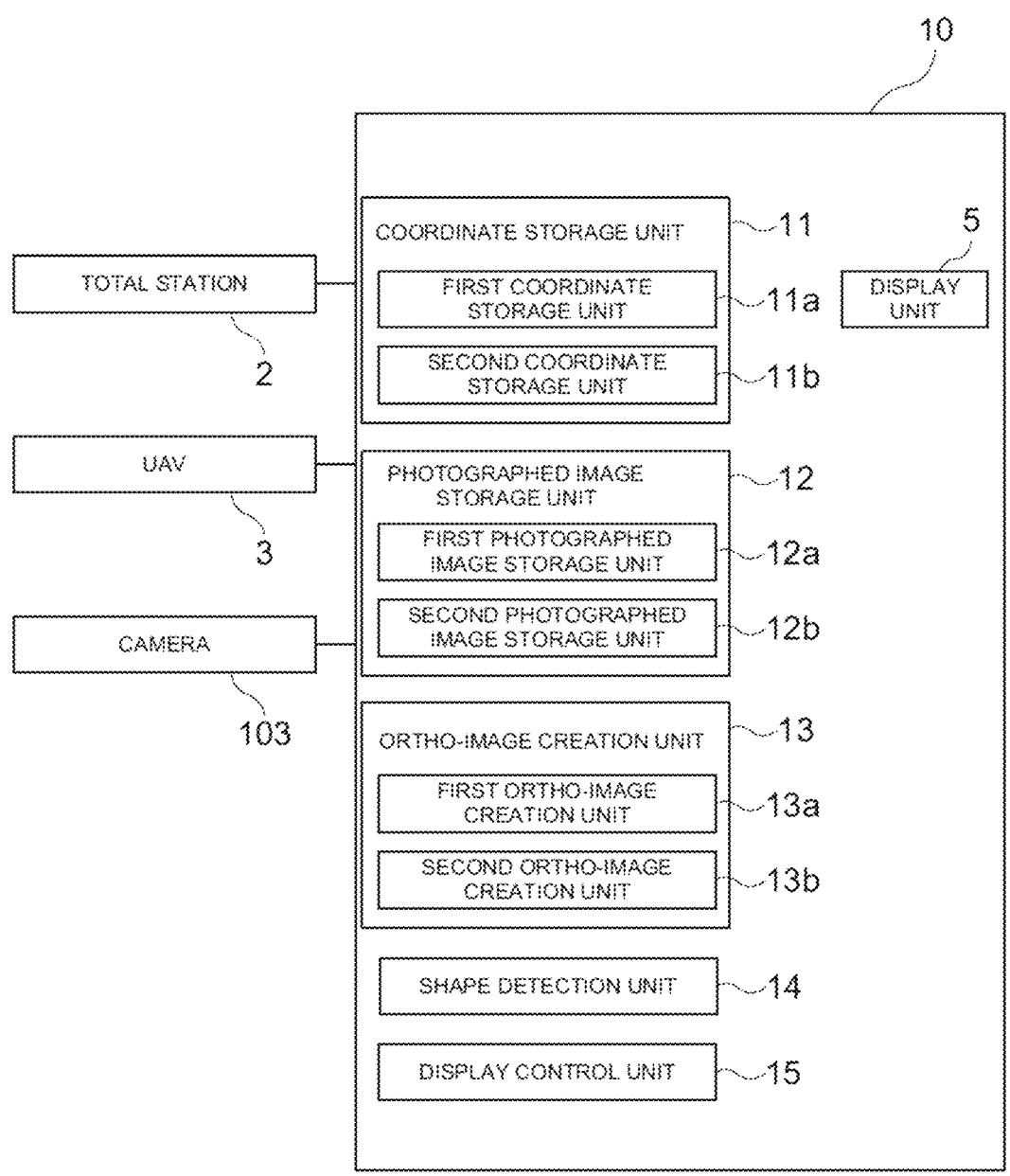
FIG. 22 is a diagram illustrating a schematic configuration of an ortho-image creation system according to a modification of the present invention.

For example, as illustrated in FIG. 22, an ortho-image creation system according to a modification of the present invention may have a total station 2 installed at a known point (for example, a reference point), a UAV 3 (Unmanned Aerial Vehicle) as a photographing apparatus, a camera 103 as a photographing apparatus, and an ortho-image creation apparatus 10 wirelessly connected to the total station 2, the UAV 3 and the camera 103.

Figure 23A:
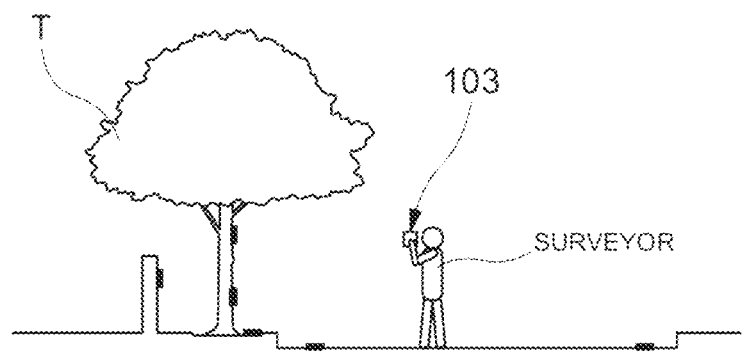
FIGS. 23A and 23B are diagrams each illustrating operation of photographing by a camera disposed at an altitude lower than an obstacle.
Figure 23B:
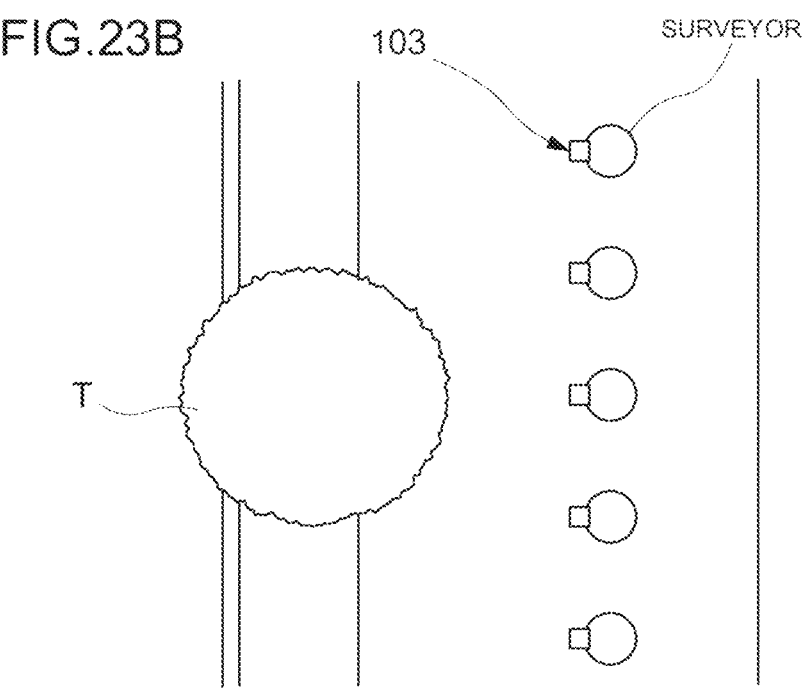

In this modification, a road is photographed by the UAV 3 when the road, a road surface of which is partially covered by an obstacle when viewed from the sky, is photographed from an altitude higher than the obstacle, and the road is photographed by the camera 103 when an area covered by the obstacle is photographed from an altitude lower than the obstacle. That is, a surveyor who is in an area where the road surface is partially covered by an obstacle T operates the camera 103 to photograph an area (the road surface and the obstacle T) that includes a plurality of survey markers 6 installed on the road surface, and on a side surface or the like of the obstacle T which is a portion other than the road surface, as illustrated in FIGS. 23A and 23B. In this case, while moving, the surveyor photographs a plurality of photographed images such that each of a plurality of survey markers 6 is included in at least two of photographed images.

In the above embodiment, when the ortho-image is created on the basis of the three-dimensional coordinates of the survey markers 6 and the plurality of photographed images, SfM (Structure from Motion) analysis software is used. Processes by the SfM analysis software include: (1) a point cloud formation process of constituting a cloud of a plurality of pieces of point cloud data corresponding to a plurality of locations, (2) a TIN process (meshing process of meshing the cloud of the point cloud data formed in the point cloud formation process) of converting the point cloud data into a three-dimensional TIN model (Triangulated Irregular Network) which is aggregate of triangular planes obtained by connecting the point cloud data as Vertices, and (3) an ortho-image creation process of creating an ortho-image on the basis of the three-dimensional TIN Model obtained by the conversion in the TIN process. The ortho-image (the provisional ortho-image and the corrected ortho-image) of the present invention is obtained by performing the ortho-image creation process by the SfM analysis software, and the three-dimensional model (the provisional three-dimensional model and the corrected three-dimensional model) of the present invention is obtained by performing the point cloud formation process by the SfM analysis software, or is obtained by performing the TIN process after the point cloud formation process by the SfM analysis software. That is, the three-dimensional model (point cloud data) is created by performing the point cloud formation process by the SfM analysis software, the three-dimensional model (point cloud data obtained after the TIN process) is created by performing the TIN process after the point cloud formation process by the SfM analysis software.

(Creation Method of Corrected Ortho-Image)

In the present invention, the SfM analysis is performed for a plurality of photographed images photographed from an altitude higher an obstacle and the three-dimensional coordinates of the survey markers 6 included in these photographed images, the SfM analysis is performed for a plurality of photographed images photographed from an altitude lower the obstacle and the three-dimensional coordinates of the survey markers 6 included in these photographed images, and these pieces of data are integrated, so that the corrected ortho-image is created.

As the method for creating the corrected ortho-image by integrating data obtained by performing the SfM analysis for the plurality of photographed images photographed from the altitude higher than the obstacle and the three-dimensional coordinates of the survey markers 6 included in these photographed images, and data obtained by performing the SfM analysis for the plurality of photographed images photographed from the altitude lower than the obstacle and the three-dimensional coordinates of the survey markers 6 included in these photographed images, the following methods will be described. In the above embodiment, the case of using the following (Integration Method 3 for Creating Corrected Ortho-image) is described. However, the integration method for creating a corrected ortho-image is optional.

Integration Method 1 for Creating Corrected Ortho-Image

Data obtained by performing the SfM analysis for a plurality of photographed images photographed from an altitude lower than an obstacle and the three-dimensional coordinates of the survey markers 6 included in these photographed images in the point cloud formation process is integrated with data obtained by performing the SfM analysis for a plurality of photographed images photographed from an altitude higher than the obstacle and the three-dimensional coordinates of the survey markers 6 included in these photographed images in the point cloud formation process, and thereafter the TIN process and the ortho-image creation process are performed for the integrated data, so that the corrected ortho-image is created.

Integration Method 2 for Creating Corrected Ortho-Image

Data obtained by performing the TIN process after the point cloud formation process of the SfM analysis for a plurality of photographed images photographed from an altitude lower than an obstacle and the three-dimensional coordinates of the survey markers 6 included in these photographed images is integrated with data obtained by performing the TIN process after the point cloud formation process of the SfM analysis for a plurality of photographed images photographed from an altitude higher than the obstacle and the three-dimensional coordinates of the survey markers 6 included in these photographed images, and thereafter the ortho-image creation process is performed for the integrated data, so that the corrected ortho-image is created.

Integration Method 3 for Creating Corrected Ortho-Image

Data obtained by performing the ortho-image creation process after the point cloud formation process and the TIN process of the SfM analysis for a plurality of photographed images photographed from an altitude lower than an obstacle and the three-dimensional coordinates of the survey markers 6 included in these photographed images is integrated with data obtained by performing the ortho-image creation process after the point cloud formation process and the TIN process of the SfM analysis for a plurality of photographed images photographed from an altitude higher than the obstacle and the three-dimensional coordinates of the survey markers 6 included in these photographed images, so that the corrected ortho-image is created.

Integration Method 4 for Creating Corrected Ortho-Image

The point cloud formation process, the TIN process, and the ortho-image creation process of the SfM analysis are performed for a plurality of photographed images photographed from an altitude lower than an obstacle and the three-dimensional coordinates of the survey markers 6 included in these photographed images, and a plurality of photographed images photographed from an altitude higher than the obstacle and the three-dimensional coordinates of the survey markers 6 included in these photographed images that are put together, so that the corrected ortho-image is created.

Creation Method of Corrected Three-Dimensional Model
In the present invention, the SfM analysis is performed for the plurality of photographed images photographed from the altitude higher than the obstacle and the three-dimensional coordinates of the survey markers 6 included in these photographed images, the SfM analysis is performed for the plurality of photographed images photographed from the altitude lower than the obstacle and the three-dimensional coordinates of the survey markers 6 included in these photographed images, these pieces of data are integrated, so that the corrected three-dimensional model is created.

As the method for creating the corrected three-dimensional model obtained by integrating data obtained by performing the SfM analysis for the plurality of photographed images photographed from the altitude higher than the obstacle and the three-dimensional coordinates of the survey markers 6 included in these photographed images, and data obtained by performing the SfM analysis for the plurality of photographed images photographed from the altitude lower than the obstacle and the three-dimensional coordinates of the survey markers 6 included in these photographed images, the following methods will be described. In the above embodiment, the case of using the following (Integration Method 1 for Creating Corrected Three-dimensional Model) is described. However, the integration method for creating a corrected three-dimensional model is optional.

Integration Method 1 for Creating Corrected Three-Dimensional Model
Data obtained by performing the SfM analysis for a plurality of photographed images photographed from an altitude lower than an obstacle and the three-dimensional coordinates of the survey markers 6 included in these photographed images in the point cloud formation process is integrated with data obtained by performing the SfM analysis for a plurality of photographed images photographed from an altitude higher than the obstacle and the three-dimensional coordinates of the survey markers 6 included in these photographed images in the point cloud formation process, so that the corrected three-dimensional model is created.

Integration Method 2 for Creating Corrected Three-Dimensional Model
Data obtained by performing the SfM analysis for a plurality of photographed images photographed from an altitude lower than an obstacle and the three-dimensional coordinates of the survey markers 6 included in these photographed images in the point cloud formation process is integrated with data obtained by performing the SfM analysis for a plurality of photographed images photographed from an altitude higher than the obstacle and the three-dimensional coordinates of the survey markers 6 included in these photographed images in the point cloud formation process, and then the TIM process is performed to the integrated data, so that the corrected three-dimensional model is created.

Integration Method 3 for Creating Corrected Three-Dimensional Model
Data obtained by performing the TIN process after the point cloud formation process of the SfM analysis for a plurality of photographed images photographed from an altitude lower than an obstacle and the three-dimensional coordinates of the survey markers 6 included in these photographed images is integrated with data obtained by performing the TIN process after the point cloud formation process of the SfM analysis for a plurality of photographed images photographed from an altitude higher than the obstacle and the three-dimensional coordinates of the survey markers 6 included in these photographed images, so that the corrected three-dimensional is created.

Integration Method 4 for Creating Corrected Three-Dimensional Model
The Point amid formation process of the SfM analysis is performed for a plurality of photographed images photographed from an altitude lower than an obstacle and the three-dimensional coordinates of the survey markers 6 included in these photographed images, and a plurality of photographed images photographed from an altitude higher than the obstacle and the three-dimensional coordinates of the survey markers 6 included in these plurality of photographed images that are put together, so that the corrected three-dimensional model is created.

Integration Method 5 for Creating Corrected Three-Dimensional Model
The TIN process is performed after the point cloud formation process of the SfM analysis for a plurality of photographed images photographed from an altitude lower than an obstacle and the three-dimensional coordinates of the survey markers 6 included in these photographed images, and a plurality of photographed images photographed from an altitude higher than the obstacle and the three-dimensional coordinates of the survey markers 6 included in these plurality of photographed images that are integrated, so that the corrected three-dimensional model is created.

In the above integration method for creating a corrected ortho-image or the above integration method for creating a corrected three-dimensional model, the data obtained by performing the SfM analysis for the plurality of photographed images photographed from the altitude lower than the obstacle and the three-dimensional coordinates of the survey markers 6 included in these photographed images is integrated with the data obtained by performing the SfM analysis for the plurality of photographed images photographed from the altitude higher than the obstacle and the three-dimensional coordinates of the survey markers 6 included in these photographed images. However, the data obtained by performing the SfM analysis for the plurality of photographed images photographed from the altitude higher than the obstacle and the three-dimensional coordinates of the survey markers 6 included in these photographed images may be integrated with the data obtained by performing the SfM analysis for the plurality of photographed images photographed from the altitude lower than the obstacle and the three-dimensional coordinates of the survey markers 6 included in these photographed images.

DESCRIPTION OF REFERENCE NUMERALS

1 ortho-image creation system
2 total station
3 UAV (unmanned aerial vehicle)
4 3D scanner (three-dimensional scanning apparatus)
5 display unit
6 survey marker
10 ortho-image creation apparatus
11 coordinate storage unit
11*a* first coordinate storage unit (first coordinate storage means)

11b second coordinate storage unit (second coordinate storage means)
12 photographed image storage unit
12a first photographed image storage unit (first photographed image storage means)
12b second photographed image storage unit (second photographed image storage means)
13 ortho-image creation unit
13a first ortho-image creation unit (first ortho-image creation means)
13b second ortho-image creation unit (second ortho-image creation means)
14 shape detection unit (shape detection means)
15 display control unit
101 three-dimensional model creation system
103 camera
113 three-dimensional model creation unit
113a first three-dimensional model creation unit (first three-dimensional model means)
113b second three-dimensional model creation unit (second three-dimensional model means)

What is claimed is:

1. An ortho-image creation method comprising:
first photographing of photographing a road, a road surface of which is partially covered by an obstacle when viewed from sky, from an altitude higher than the obstacle by a first photographing apparatus, and obtaining a plurality of first photographed images;
second photographing of photographing an area covered by the obstacle from an altitude lower than the obstacle by a second photographing apparatus, and obtaining a plurality of second photographed images;
first coordinate acquisition of acquiring three-dimensional coordinates of a first feature point located outside the area covered by the obstacle and included in at least two of the plurality of first photographed images;
second coordinate acquisition of acquiring three-dimensional coordinates of a second feature point located in the area covered by the obstacle and included in at least two of the plurality of second photographed images; and
an ortho-image creation of creating a corrected ortho-image obtained by correcting at least a part of the area covered by the obstacle in the road surface to an area not covered by the obstacle, on the basis of the plurality of first photographed images photographed by the first photographing, the plurality of second photographed images photographed by the second photographing, the three-dimensional coordinates of the first feature point acquired by the first coordinate acquisition, and the three-dimensional coordinates of the second feature point acquired by the second coordinate acquisition.

2. The ortho-image creation method according to claim 1, wherein
the ortho-image creation includes:
first ortho-image creation of creating a provisional ortho-image in which the road surface is partially covered by the obstacle, on the basis of the plurality of first photographed images photographed by the first photographing, and the three-dimensional coordinates of the first feature point acquired by the first coordinate acquisition;
shape detection of detecting a shape of the road surface and at least a part of a portion other than the road surface in the area covered by the obstacle, on the basis of the plurality of second photographed images photographed by the second photographing and the three-dimensional coordinates of the second feature point acquired by the second coordinate acquisition; and
second ortho-image creation of creating the corrected ortho-image obtained by correcting at least a part of an area covered by the obstacle in the provisional ortho-image created by the first ortho-image creation to an area not covered by the obstacle.

3. The ortho-image creation method according to claim 1, wherein
the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

4. The ortho-image creation method according to claim 1, wherein
in the second photographing, a plurality of markers are installed on the road surface and the obstacle in the area covered by the obstacle, and photographing is performed such that each of the plurality of markers is included as the second feature point in at least two of the second photographed images.

5. A marker used for the ortho-image creation method according to claim 4, the marker being a seal-like marker having a back surface formed with an adhesive layer.

6. An ortho-image creation system comprising:
a first photographed image storage unit for storing a plurality of first photographed images obtained by photographing a road, a road surface of which is partially covered by an obstacle when viewed from sky, from an altitude higher than the obstacle by a first photographing apparatus;
a second photographed image storage unit for storing a plurality of second photographed images obtained by photographing an area covered by the obstacle from an altitude lower than the obstacle by a second photographing apparatus;
a first coordinate storage unit for storing three-dimensional coordinates of a first feature point located outside the area covered by the obstacle and included in at least two of the plurality of first photographed images;
a second coordinate storage unit for storing three-dimensional coordinates of a second feature point located in the area covered by the obstacle and included in at least two of the plurality of second photographed images; and
an ortho-image creation unit for creating a corrected ortho-image obtained by correcting at least a part of the area covered by the obstacle in the road surface to an area not covered by the obstacle, on the basis of the plurality of first photographed images stored in the first photographed image storage unit, the plurality of second photographed images stored in the second photographed image storage unit, the three-dimensional coordinates of the first feature point stored in the first coordinate storage unit, and the three-dimensional coordinates of the second feature point stored in the second coordinate storage unit.

7. The ortho-image creation system according to claim 6, wherein the ortho-image creation unit includes:
a first ortho-image creation unit for creating a provisional ortho-image in which the road surface is partially covered by the obstacle, on the basis of the plurality of first photographed images stored in the first photographed image storage unit, and the three-dimensional coordinates of the first feature point stored in the first coordinate storage unit;

a shape detection unit for detecting a shape of the road surface and at least a part of a portion other than the road surface in the area covered by the obstacle, on the basis of the plurality of second photographed images stored in the second photographed image storage unit and the three-dimensional coordinates of the second feature point stored in the second coordinate storage unit; and a second ortho-image creation unit for creating the corrected ortho-image obtained by correcting at least a part of an area covered by the obstacle in the provisional ortho-image created by the first ortho-image creation unit to an area not covered by the obstacle.

8. The ortho-image creation system according to claim 6, wherein the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

9. The ortho-image creation system according to claim 6, wherein the plurality of second photographed images stored in the second photographed image storage unit are photographed such that each of a plurality of markers installed on the road surface and the obstacle in the area covered by the obstacle is included as the second feature point in at least two of the second photographed images.

10. A marker used for the ortho-image creation system according to claim 9, the marker being a seal-like marker having a back surface formed with an adhesive layer.

11. A three-dimensional model creation method comprising:

first photographing of photographing a road, a road surface of which is partially covered an obstacle when viewed from sky, from an altitude higher than the Obstacle by a first photographing apparatus, and obtaining a plurality of first photographed images;

second photographing of photographing an area covered by the obstacle from an altitude lower than the obstacle by a second photographing apparatus, and obtaining a plurality of second photographed images;

first coordinate acquisition of acquiring three-dimensional coordinates of a first feature point located outside the area covered by the obstacle and included in at least two of the plurality of first photographed images;

second coordinate acquisition of acquiring three-dimensional coordinates of a second feature point located in the area covered by the obstacle and included in at least two of the plurality of second photographed images; and three-dimensional model creation of creating a corrected three-dimensional model obtained by correcting at least a part of the area covered by the obstacle in the road surface to an area not covered by the obstacle, on the basis of the plurality of first photographed images photographed by the first photographing, the plurality of second photographed images photographed by the second photographing, the three-dimensional coordinates of the first feature point acquired by the first coordinate acquisition, and the three-dimensional coordinates of the second feature point acquired by the second coordinate acquisition.

12. The three-dimensional model creation method according to claim 11, wherein the three-dimensional model creation includes:

first three-dimensional model creation of creating a provisional three-dimensional model in which the road surface is partially covered by the obstacle, on the basis of the plurality of first photographed images photographed by the first photographing, and the three-dimensional coordinates of the first feature point acquired by the first coordinate acquisition;

shape detection of detecting a shape of the road surface and at least a part of a portion other than the road surface in the area covered by the obstacle, on the basis of the plurality of second photographed images photographed by the second photographing and the three-dimensional coordinates of the second feature point acquired by the second coordinate acquisition; and second three-dimensional model creation of creating the corrected three-dimensional model obtained by correcting at least a part of an area covered by the obstacle in the provisional three-dimensional model created by the first three-dimensional model creation to au area not covered by the obstacle.

13. The three-dimensional model creation method according to claim 11, wherein the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

14. The three-dimensional model creation method according to claim 11, wherein in the second photographing, a plurality of markers are installed on the road surface and the obstacle in the area covered by the obstacle, and photographing is performed such that each of the plurality of markers is included as the second feature point in at least two of the second photographed images.

15. A marker used for the three-dimensional model creation method according to claim 14, the marker being a seal-like marker having a back surface formed with an adhesive layer.

16. A three-dimensional model creation system comprising:

a first photographed image storage unit for storing a plurality of first photographed images obtained by photographing a road, a road surface of which is partially covered by an obstacle when viewed from sky, from an altitude higher than the obstacle by a first photographing apparatus;

a second photographed image storage unit for storing a plurality of second photographed images obtained by photographing an area covered by the obstacle from an altitude lower than the obstacle by a second photographing apparatus;

a first coordinate storage unit for storing three-dimensional coordinates of a first feature point located outside the area covered by the obstacle and included in at least two of the plurality of first photographed images;

a second coordinate storage unit for storing three-dimensional coordinates of a second feature point located in the area covered by the obstacle and included in at least two of the plurality of second photographed images; and a three-dimensional model creation unit for creating a corrected three-dimensional model obtained by correcting at least a part of the area covered by the obstacle in the road surface to an area not covered by the obstacle, on the basis of the plurality of first photographed images stored in the first photographed image storage unit, the plurality of second photographed images stored in the second photographed image storage unit, the three-dimensional coordinates of the first feature point stored in the first coordinate storage unit, and the three-dimensional coordinates of the second feature point stored in the second coordinate storage unit.

17. The three-dimensional model creation system according to claim 16, wherein
the three-dimensional model creation unit includes:
a first three-dimensional model creation unit for creating a provisional three-dimensional model in which the road surface is partially covered by the obstacle, on the basis of the plurality of first photographed images stored in the first photographed image storage unit, and the three-dimensional coordinates of the first feature point stored in the first coordinate storage unit;
a shape detection unit for detecting a shape of the road surface and at least a part of a portion other than the road surface in the area covered by the obstacle, on the basis of the plurality of second photographed images stored in the second photographed image storage unit and the three-dimensional coordinates of the second feature point stored in the second coordinate storage unit; and
a second three-dimensional model creation unit for creating the corrected three-dimensional model obtained by correcting at least a part of an area covered by the obstacle in the provisional three-dimensional model created by the first three-dimensional model creation unit to an area not covered by the obstacle.

18. The three-dimensional model creation system according to claim 16, wherein
the first photographing apparatus is an unmanned aerial vehicle or a model aircraft that flies at the altitude higher than the obstacle, and the second photographing apparatus is an unmanned aerial vehicle or a model aircraft that flies at the altitude lower than the obstacle, or a camera disposed at the altitude lower than the obstacle.

19. The three-dimensional model creation system according to claim 16, wherein
the plurality of second photographed images stored in the second photographed image storage unit are photographed such that each of a plurality of markers installed on the road surface and the obstacle in the area covered by the obstacle is included as the second feature point in at least two of the second photographed images.

20. A marker used for the three-dimensional model creation system according to claim 19,
the marker being a seal-like marker having a back surface formed with an adhesive layer.

* * * * *